United States Patent
Elder et al.

(10) Patent No.: US 12,469,070 B2
(45) Date of Patent: *Nov. 11, 2025

(54) ITEM LEVEL DATA DETERMINATION DEVICE, METHOD, AND NON-TRANSITORY COMPUTER-READABLE MEDIA

(71) Applicant: Capital One Services, LLC, McLean, VA (US)

(72) Inventors: Brice Elder, Mishawaka, IN (US); Aditya Pai, San Francisco, CA (US); Sarah Olsen, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,437

(22) Filed: Feb. 7, 2024

(65) Prior Publication Data
US 2024/0177222 A1 May 30, 2024

Related U.S. Application Data

(63) Continuation of application No. 18/090,106, filed on Dec. 28, 2022, now Pat. No. 11,928,722, which is a
(Continued)

(51) Int. Cl.
*G06Q 30/0601* (2023.01)
*G06Q 30/012* (2023.01)

(52) U.S. Cl.
CPC ....... *G06Q 30/0635* (2013.01); *G06Q 30/012* (2013.01); *G06Q 30/0639* (2013.01); *G06Q 30/0643* (2013.01)

(58) Field of Classification Search
CPC ............. G06Q 30/0635; G06Q 30/012; G06Q 30/0639; G06Q 30/0643; G06Q 20/389
See application file for complete search history.

(56) References Cited

U.S. PATENT DOCUMENTS 9,092,773 B2 7/2015 Daly et al.
11,257,049 B1 2/2022 Durazo Almeida et al.
(Continued)

OTHER PUBLICATIONS

Sabab, Shahed, eExpense: A Smart Approach to Track Everyday Expenses, Sep. 1, 2018, 2018 4th International Conference on Electrical Engineering and Information & Communications Technology (iCEEiCT), pp. 136-141 (Year: 2018).*
(Continued)

*Primary Examiner* — Yogesh C Garg
*Assistant Examiner* — Timothy J Kang
(74) *Attorney, Agent, or Firm* — Banner & Witcoff, Ltd.

(57) ABSTRACT

Systems, methods, apparatuses, and computer-readable media are provided for determining individual item-level details associated with a transaction. A plurality of purchase transactions associated with different merchants may be displayed via a user interface. Responsive to a user selection of a first transaction, of the plurality of transactions, a camera may capture an image of at least a portion of a user receipt associated with the first transaction. The image of the user receipt may be analyzed using one or more optical character recognition (OCR) algorithms to convert the image of the user receipt into textual data. One or more character strings associated with line item-level details may be extracted from the textual data associated with the first transaction. Additional information associated with the line item details may be determined and the line item details and the additional information may be displayed via a user interface.

20 Claims, 17 Drawing Sheets

Related U.S. Application Data continuation of application No. 17/195,302, filed on Mar. 8, 2021, now Pat. No. 11,587,148.

(56) References Cited

U.S. PATENT DOCUMENTS

| | | | |
|---|---|---|---|
| 2010/0121771 A1* | 5/2010 | Schultz | G07F 17/42 235/375 |
| 2012/0072280 A1* | 3/2012 | Lin | G06Q 30/0246 705/14.45 |
| 2012/0078682 A1 | 3/2012 | Pinsley et al. | |
| 2012/0166333 A1 | 6/2012 | von Behren et al. | |
| 2012/0203632 A1 | 8/2012 | Blum et al. | |
| 2014/0095985 A1 | 4/2014 | Argue et al. | |
| 2016/0005126 A1* | 1/2016 | Ghosh | G06Q 40/06 705/36 R |
| 2016/0179199 A1* | 6/2016 | Levesque | G06F 3/016 340/407.2 |
| 2016/0371632 A1* | 12/2016 | Lorenzini | G06V 20/63 |
| 2017/0046758 A1 | 2/2017 | Sheehan et al. | |
| 2018/0025396 A1* | 1/2018 | Roberts | G07G 5/00 705/39 |
| 2019/0220918 A1* | 7/2019 | Koenig | G06Q 30/0641 |
| 2021/0125153 A1* | 4/2021 | Franceschi | G06F 16/24575 |

OTHER PUBLICATIONS https://www.ourcart.com/products.
Sabab, Shahed et al., "eExpense: A Smart Approach to Track Everyday Expense" 4th International Conference on Electrical Engineering and Information & Communication Technology (iCEEiCT), Sep. 1, 2018, pp. 136-141.

\* cited by examiner

ITEM LEVEL DATA DETERMINATION DEVICE, METHOD, AND NON-TRANSITORY COMPUTER-READABLE MEDIA

CROSS-REFERENCE TO RELATED APPLICATIONS

The present application is a continuation and claims priority to U.S. application Ser. No. 18/090,106, filed Dec. 28, 2021 and entitled "ITEM LEVEL DATA DETERMINATION DEVICE, METHOD, AND NON-TRANSITORY COMPUTER-READABLE MEDIA," which is a continuation of U.S. application Ser. No. 17/195,302, filed Mar. 8, 2021, and entitled "ITEM LEVEL DATA DETERMINATION DEVICE, METHOD, AND NON-TRANSITORY COMPUTER-READABLE MEDIA," which issued as U.S. Pat. No. 11,587,148 on Feb. 21, 2023, the contents of which are incorporated in its entirety.

FIELD OF USE

Aspects of the disclosure relate generally to transaction processing, and more particularly to methods of identification of transaction item-level data.

BACKGROUND

Consumers are increasingly concerned about the impact companies and corporations are making on the world, from the environment to politics to social policies. Consumers are also aware of the influence they have on such companies through their purchasing power. Many consumers want to spend their dollars with businesses whose values and practices align with their own and avoid businesses whose values and practices are contrary to theirs. However, it is not always apparent to consumers which company they are spending their money with, as branded products and services often obscure the underlying corporate entity that manufactures, produces, manages, or owns the product or service. Moreover, when companies are subsidiaries of or affiliated with another company, it is often not apparent what company is the parent or the co-affiliate company. Having such knowledge about parent companies and/or affiliate companies associated with a particular product or service purchased by the consumer would provide the consumer with the ability to make more informed buying decisions. Accordingly, there is a need for a system that enables consumers to access deeper information about their spending.

SUMMARY

The following presents a simplified summary in order to provide a basic understanding of various aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the detailed description below.

Aspects of the disclosure relate to systems, apparatuses, computer-readable media, and methods for determining transaction line item-level data associated with a purchase transaction, corresponding products associated with the transaction line items, and corporate entities associated with the identified products.

In accordance with aspects of the disclosure, various transaction processing techniques are described herein that may allow a user to access a transaction account, such as a credit card or a bank account, via an application such as a desktop or mobile application. In accessing the transaction account, the user may view the user's purchase transactions from various merchants. For a given purchase transaction, the user may request to view line item-level details associated with the transaction. For instance, the user's transaction account may show a purchase transaction associated with a big-box store, and the user may request to view a list of items purchased during that transaction. In some instances, information about the items purchased may be retrieved by querying one or more merchant systems for the transaction and receiving from the merchant systems the line item-level data associated with the transaction. Alternatively or additionally, information about the items purchased may be retrieved from a purchase receipt associated with the transaction and submitted by the user. For instance, the user may be requested to submit a photo of the purchase receipt associated with the transaction, and various image processing techniques may be used to analyze the receipt and identify character strings that correspond to line items data associated with the purchase transaction. Additional information may further be retrieved for each of the identified line items, such as a full product name, a brand name, and a corporate entity associated with the product and/or brand. Such information may be appended to the corresponding line item data and displayed to the user. In obtaining such information regarding the corporate entities associated with the various products purchased by the user, the user may further be provided with one or more aggregated lists, grouped by corporate entity, of items purchased across different purchase transactions and different merchants and associated with the corporate entity.

In accordance with additional aspects of the disclosure, information associated with the identified products, brands, and/or corporate entities may be determined, such as contact information for the corporate entity, warranty information associated with the purchased product, return policy information associated with the purchased product, a merchant in proximity to the user selling a previously purchased item at a lower price, and the like.

These and other features and advantages of the disclosure will be apparent from the detailed description provided below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
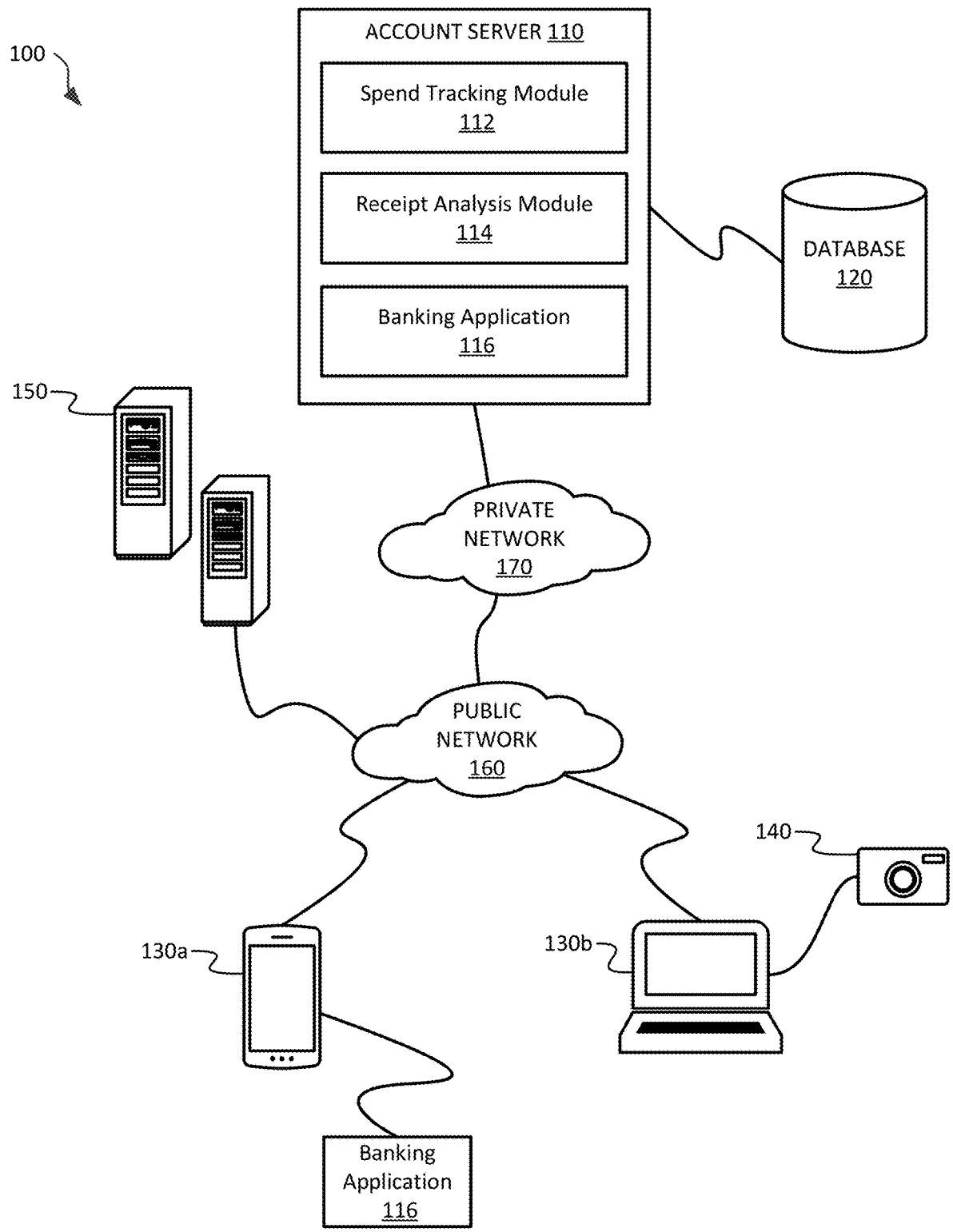
FIG. 1 illustrates an example computing environment for implementing an item-level data determination system, in accordance with one or more aspects described herein.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods, systems, devices, and computer-readable media for ascertaining, from a purchase transaction associated with a user account maintained at a financial institution, individual items purchased during the transaction. Electronic payment processing networks are networks of systems and devices associated with merchants, payment processors, financial institutions, and the like that interact with one another to process and authorize a payment transaction, such as a credit card purchase. Conventionally, in such electronic payment processing networks, a financial institution system may receive, from a payment processor system, summary-level information related to a purchase transaction, such as a transaction to purchase a plurality of items using a payment card of an account holder. The summary-level information received from the payment processor system may include information such as a merchant name, a transaction date, a total transaction amount, payment card information, and the like. The financial institution system, however, might not receive information related to the individual items purchased during the transaction, and more generally might not have access to such information. However, information related to the individual items purchased during a transaction, along with additional information related to the individual items is important to capture in order to provide the account holder with a detailed and complete view of their purchase history and spending. Obtaining such information, however, presents a technical challenge, since payment processor systems that provide the summary-level information to financial institution systems might not capture information at the individual line item level to provide to the financial institution. Further while some merchants may maintain this information, there might not be a standard or uniform practice for doing so. As a result, there may be uniformity challenges with respect to the degree and quality of item-level data that may be obtained from merchant systems. Accordingly, a solution for efficiently and seamlessly determining and acquiring individual line item data associated with a transaction and providing such information to a user in a cohesive and uniform manner is needed.

Referring to FIG. 1, an example computing environment 100 for an item-level data determination system is provided. The example computing environment 100 may include one or more systems or computing devices, such as an account server 110, a database 120, one or more user computing devices 130 (e.g., a first user computing device 130a and/or a second user computing device 130b), an image capturing device 140, a merchant computing device 150, a public network 160, and a private network 170. Although the various systems and computing devices in the computing environment 100 are shown and described as separate devices, one or more of the computing devices, may be part of a single computing device without departing from the disclosure.

The account server 110 may be a server used to provide functionality associated with a transaction account, such as a bank account, a credit card account, a commercial account, a line of credit, or the like, maintained by a banking or other financial institution. For instance, an account holder having a credit card account issued by her banking institution may initiate a purchase transaction with a merchant using her credit card. The merchant may, prior to finalizing the purchase, seek approval for the purchase transaction from a payment processor system associated with the credit card. In order to receive authorization for the purchase transaction, the payment processor system may send information associated with the purchase transaction to a system associated with the banking institution that issued the credit card. The banking institution system may execute one or more processes to make an authorization determination. For example, the banking institution system may assess potential fraud associated with the purchase transaction and may confirm the account holder has sufficient credit to cover the purchase amount. The banking institution system may send the authorization determination back to the payment processor system for approval or denial of the purchase transaction.

Upon a determination that the purchase transaction should be authorized, the banking institution system may additionally send the purchase transaction information received from the payment processor system to the account server 110 so that one or more accounting functions related to the account holder's credit card account in view of the purchase transaction may be executed. For instance, the amount of the purchase transaction may be debited from the account holder's credit card account balance, any necessary interest or fees may be applied, rewards or points may be calculated, and the like. The account server 110 may cause the purchase transaction information to be stored in a database, such as the database 120. The purchase transaction information may include, for example, a merchant identification, a merchant name, a merchant city, a merchant state, a merchant zip code, a merchant category, a purchase date and time, a purchase amount, and a payment card account number. The account server 110 may perform one or more processes to obtain supplemental information about the merchant associated with the purchase transaction. For example, the account server 110 may query a database, such as database 120 or a third-party database, to retrieve more precise information about the merchant than was provided by the payment processor—such as a merchant sub-category (e.g., the received merchant category may be a generic category such as "restaurant" and the retrieved merchant sub-category may be "fast-casual" or "Asian fusion") or a merchant address or geographic coordinates (e.g., longitude and latitude coordinates), a merchant web-site, a merchant email address or phone number, a merchant return policy, store hours associated with the merchant, or the like. Additionally or alternatively, the account server 110 may analyze a website associated with the merchant to determine some or all of the supplemental information. Some or all of the retrieved supplemental information may be stored together with the corresponding purchase transaction in the database 120. The account server 110 may additionally cause other types of transaction information related to the account holder's account to be stored in the database 120, such as transactions associated with refunds or other credits, payments made by the account holder, interest, fees, etc.

The account server 110 may include one or more modules or applications, such as a spend tracking module 112, a receipt analysis module 114, and a banking application 116.

The spend tracking module 112 may be used by the account server 110 to analyze an account holder's transactions and spending. To provide a detailed analysis of the account holder's spending, the account server 110 may control the spend tracking module 112 to determine detailed data associated with the transactions. For instance, the account server 110 may control the spend tracking module 112 to determine individual items, i.e., line item details, for a given transaction. By way of example, an account holder may make a purchase in the amount of $100.45 from Merchant A. When the account server 110 receives the purchase transaction information sent from a payment processor system, the purchase information may only include high level information, such as the merchant information, the total amount of the purchase transaction, and payment card information, but might not include information related to the individual items that made up the purchase, such as each item that was purchased during the transaction. For example, the $100.45 purchase transaction may include a purchase for four separate items, such as soap for $3.27, diapers for $53.49, laundry detergent for $28.70, and ibuprofen for $14.99. Such line item-level data may be useful in assisting an account holder to more thoroughly and meaningfully track her spending.

The account server 110 may control the spend tracking module 112 to request the line item data for a purchase transaction from the merchant associated with the transaction. The spend tracking module 112 may identify, from the transaction information in the database 120, the merchant associated with the transaction and may send to a computing device associated with the merchant, such as the merchant computing device 150, transaction identification information. The transaction identification information may comprise one or more of a transaction number, a date and time of the transaction, a location (e.g., city, state, zip code, etc.) of the merchant, a transaction amount, payment card information, or the like. In response, the merchant computing device 150 may send, to the account server 110, line item data associated with the transaction. The line item data may include a name of the item purchased, a price of the item, and/or a quantity of the item purchased. The account server 110 may control the spend tracking module 112 to associate, in the database 120, the line item data with the corresponding transaction.

Additionally or alternatively, the account server 110 may control the spend tracking module 112 to request the line item details from the account holder. In this case, the spend tracking module 112 may prompt the account holder, using an application such as the banking application 116, to submit an image of a receipt associated with the transaction. The spend tracking module 112 may receive the image of the receipt and the image may be processed by the receipt analysis module 114, using one or more image analysis and/or computer vision techniques, such as optical character recognition (OCR), object recognition, or the like, to convert the image of the receipt into text and/or one or more objects. During the image analysis, the receipt analysis module 114 may use one or more pre-processing techniques on the receipt image to prepare for converting the image into text and/or one or more objects. The pre-processing techniques may include one or more of zoning, de-skewing, despeckling, binarization, character isolation, line removal, and normalization. After the use of any pre-processing techniques, the receipt analysis module 114 may tokenize potential characters identified in the image and may further perform token matching using one or more pattern recognition and/or feature extraction techniques to identify the actual characters. After identification of the characters, the receipt analysis module 114 may use one or more post-processing techniques to correct any errors in the converted text. For instance, the receipt analysis module 114 may use lexical restriction, optimization techniques, and/or natural language processing to perform any necessary corrections of the converted text. After the image analysis is complete, some or all of the converted text may be cached in memory or stored in the database 120.

After converting the image of the receipt to text, the account server 110 may control the receipt analysis module 114 to analyze the converted text to extract the line item details from the text. In some cases, the receipt analysis module 114 may use a template to extract the line item details from the text. For instance, the receipt analysis module 114 may query a database, such as the database 120, to retrieve a template associated with a particular merchant. The template may specify the receipt format that the merchant uses. For instance, the template for Merchant A may specify the receipt format for Merchant A's receipts. The template may indicate, for example, that the first line of a Merchant A receipt comprises the merchant name, the second line comprises the merchant address, the third line comprises the merchant city, state, and zip, lines four and six comprise blank lines or extraneous text, line five comprises the transaction date and time, and line seven begins the line item details for the transaction. The template may further specify, for example, that a line comprising a predetermined string of characters, such as all equal signs (e.g., "========"), may indicate the end of the transaction line item details. The template may further specify, for example, that the line after such string of characters comprises the total amount of the transaction, and the line thereafter, for example, comprises the payment card account number. The receipt analysis module 114 may use the Merchant A template in performing the extraction of text from a receipt for a transaction associated with Merchant A. Different merchants may use different formats for their receipts and, as a result, a unique template may be stored in the database 120 for each merchant.

Initially, the receipt analysis module 114 may use the template to extract from the converted text the name of the merchant name, the merchant city, the merchant state, the merchant zip code, the date and time of the transaction, the total amount of the transaction, the payment card account number, and/or other information that may be used to confirm that the receipt corresponds to the transaction for which the line item data is sought. To this end, the spend tracking module 112 may use such information extracted by the receipt analysis module 114 to compare to the corresponding information received from the payment processor system for the transaction and stored in the database 120. The spend tracking module 112 may determine that the submitted receipt corresponds to the transaction for which the line item data is sought if one or more of the merchant name, the merchant city, the merchant state, the merchant zip code, the date and time of the transaction, the total amount of the transaction, and/or the payment card account number extracted from the receipt match with the corresponding information received from the payment processor system and stored in the database 120.

If the spend tracking module 112 determines that the receipt does not correspond to the transaction for which the line item data is sought, e.g., the account holder accidently submitted the wrong receipt, the spend tracking module 112 may reject the receipt and notify the account holder that the receipt does not match the details of the transaction for which the line item data is sought. The spend tracking module 112 may suggest that the account holder submit another receipt.

If the spend tracking module 112 determines that the receipt does correspond to the transaction for which the line item data is sought, account server 110 may control the receipt analysis module 114 to use the template to extract the line item details associated with the transaction from the converted text. Accordingly, the template may further specify a format of each line item for the particular merchant receipt. For example, the Merchant A template may specify that each line item on a Merchant A receipt begins with an item identifier, an item name, e.g., the name of the product purchased, followed by an amount paid for the item. The template may specify that the amount paid may be identified by, for example, a dollar sign character (e.g., "$") and may be distinguished by a predetermined format, such as "$xxx.xx". The receipt analysis module 114 may parse each of the line items to extract each line item element specified by the template, e.g., an item identifier, an item name, item price, item quantity, and the like.

In some instances, there might not be a template stored in the database 120 for the merchant associated with the transaction for which line item data is sought. In such cases, the receipt analysis module 114 may identify the various elements of the receipt (e.g., the merchant name, merchant city, state, zip, line item details, total amount, etc.) using machine learning techniques. For instance, the receipt analysis module 114 may use various machine learning models and/or algorithms, such as, but not limited to, supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. The machine learning model or algorithm may be trained to recognize various elements of a receipt, such as merchant information, line item details, transaction amounts, payment information, and the like. The machine learning model may analyze receipt data to identify patterns, sequences, relationships, and the like, to generate one or more machine learning datasets.

The machine learning datasets may include datasets linking various information associated with a transaction, a merchant, a product, receipt image, a receipt layout, or the like (or combinations thereof) to one or more outputs, such as various elements of a transaction receipt. The machine learning datasets, may be updated and/or validated based on later-received data. For instance, as various elements of a receipt are recognized and determined, such as merchant information, line item details, transaction amounts, payment information, or the like, the machine learning datasets may be validated and/or updated based in the newly collected or received information. In this way, the machine learning model may be trained to continuously refine and improve its determinations and outputs.

The receipt analysis module 114, using the machine learning model, may detect a layout of the receipt during image analysis. For instance, during image analysis, the receipt analysis module 114 may detect certain clusters of text on the image of the receipt and, using the machine learning model, may make predictions about the various receipt elements included therein. For example, the receipt analysis module 114 may detect three clusters of text, such as a first cluster of text centered and appearing at the top of the receipt; a second cluster of text appearing in the middle of the receipt in tabular form; and a third cluster of text left-justified and appearing at the bottom or the receipt. The receipt analysis module 114, using the machine learning model, may predict that the first cluster of text likely includes details about the merchant and the date and time of the transaction; that the second cluster of text likely includes the line item details and a total, and that the third cluster of text likely includes the payment information. Accordingly, receipt analysis module 114 may covert the image of the receipt to text on a section-by-section basis. Upon converting each section or cluster, the receipt analysis module 114 may use one or more natural language processing techniques to identify the various elements included in that section or cluster. For example, after converting the first cluster to text, the receipt analysis module 114 may use natural language processing techniques to identify text that corresponds to the merchant name, city, state, zip code, etc. In using the natural language processing techniques, the receipt analysis module 114 may further use one or more location-based language models programmed with merchant names common to different geographic areas and corresponding locations—e.g., cities, states, and/or zip codes. The receipt analysis module 114 may select a language model associated with a geographic location of the account holder. For instance, a first language model may be United States based, while a second may be Europe based. In some cases, the language model selected may be a universal model and might not be location-based. Using the natural language processing techniques, the receipt analysis module 114 may compare the converted text from the first cluster to the selected language model to determine the merchant name, city, state, zip code, etc.

The receipt analysis module 114 may perform similar functionality for the other sections or clusters. For instance, after converting the second cluster to text, the receipt analysis module 114 may detect multiple rows of text in tabular form. The receipt analysis module 114 may, using the machine learning model, determine that each row corresponds to an individual line item associated with the transaction. The receipt analysis module 114 may employ natural language processing techniques to identify the text that corresponds to each of the line items. The receipt analysis module 114 may employ a language model programmed with a library of item and/or product names and may compare each line item to the language model to determine the item or product name appearing in the line item. The receipt analysis module 114 may further identify a corresponding price for the determined item by analyzing the text for characters of a certain format, such as "$xxx.xx". The receipt analysis module 114 may repeat this process for each line item detected in the second cluster of text to identify the line item data associated with the transaction. Likewise, the receipt analysis module 114 may perform similar functionality on the third cluster of text to identify the payment card account number. For example, the receipt analysis module 114 may identify text formatted in a standard payment card format, such as "xxxx", "xxxx XXXXXX xxxxx", "************xxxx", or the like.

In cases where the receipt analysis module 114 processes a receipt without an existing template, e.g., a new merchant for which no template is stored in the database 120, the receipt analysis module 114 may generate or build a new template as it performs the above-described process of extracting the various receipt elements. The newly generated template may be associated with the new merchant and stored in the database 120.

After the receipt analysis module 114 extracts and identifies the line item data associated with the transaction, the account server 110 may control the spend tracking module 112 to associate and store the line item data with the stored transaction in the database 120.

Prior to storing the line item data, the spend tracking module 112 may determine whether line item data for the transaction already exist in the database 120, e.g., if merchant line item data was previously received from the merchant and stored. If so, the spend tracking module 112 may perform a reconciliation process to avoid redundant line item data being associated with the transaction. In this case, the stored line item data may be updated with any data missing from the stored line item data but included in the line item data extracted from the receipt. When different data is identified between the two sources, the spend tracking module 112 may employ various rules to determine which source's data should be maintained/used. The rules may specify, for example, that for merchants for whom transaction data discrepancies are never encountered or encountered less than a threshold amount of times, the merchant data should be maintained/used. While merchants for whom transaction data discrepancies are encountered more than or equal to the threshold amount of times, the receipt data should be maintained. Accordingly, the spend tracking module 112 may track and maintain, in the database 120, a history of each time such transaction data discrepancies between sources occur for each merchant.

After, during, or before storing the line item data for the transaction, the spend tracking module 112 may determine additional information associated with the line item data. For instance, the spend tracking module 112 may determine additional information associated with the merchant or the products associated with the line item data. The additional information may include contact information for the merchant, such as a phone number, a website, store hours, and/or an email address. The additional information may further include information on a return policy associated with merchant. The additional information may further include information about the individual product, such as a full product name, a brand name associated with the product, or a corporate entity associated with the product, such as a parent, subsidiary, or affiliate entity, a return policy associated with the particular product (e.g., some merchants may have a store level return policy and different policies for particular items), or warranty information associated with the product.

The spend tracking module 112 may obtain some or all of the additional information by querying one or more databases associated with the merchant or by sending a request to one or more devices associated with the merchant. The spend tracking module 112 may obtain or request the additional information from the one or more databases or devices using identifying information about the merchant, such as a merchant name coupled with a city, state, and/or zip code of the merchant, or identifying information about the product, such as an item identifier. The item identifier, for example, may be a universal product code (UPC), a stock-keeping unit (SKU), an international standard book number (ISBN), a global trade item number (GTIN), an international standard serial number (ISSN), an international standard music number (ISMN), an international article number (IAN), or the like. The spend tracking module 112 may additionally or alternatively obtain some or all of the additional information from one or more third party devices that maintain such information.

Additionally or alternatively, the spend tracking module 112 may obtain some or all of the additional information by analyzing a webpage associated with the merchant, the product, a brand associated with the product, a corporate entity associated with the product, or the like. The spend tracking module 112 may use web scraping techniques to obtain the information. For instance, the spend tracking module 112 may use one or more scripts configured to identify certain words on the web page, such as "contact us," "for more information," "return policy," "return process," "warranty claim," and the like and to extract corresponding information. In some instances, the script may be configured to access links on the web page to obtain the necessary information. The spend tracking module 112 may further use machine learning to recognize the different elements on the webpage.

The additional information may be received by the spend tracking module 112 and may be associated and stored with the corresponding line item data in the database 120. In some instances, the additional information may be stored separately from the corresponding line item data. For instance, the additional information related to the merchant may be stored separately from the corresponding line item data to avoid redundancy.

The spend tracking module 112 may generate one or more user interfaces to be output via an application, such as the banking application 116. The one or more user interfaces, as discussed in further detail with respect to FIGS. 3A-3C, 4, and 5A-5K, may be for displaying an account holder's transactions and associated line item data and corresponding additional information. Additionally or alternatively, the one or more user interfaces may be for performing various actions associated with the items purchased by the account holder, such as initiating a return of an item, initiating a warranty claim for the item, identifying other merchants selling the item, or the like. Additionally or alternatively, the one or more user interfaces may be used for outputting detailed spend tracking information generated by the spend tracking module 112.

The banking application 116 may be an application controlled by the account server 110. The banking application 116 may be associated with the account holder's bank account, credit card account, commercial account, line of credit, or the like. The account server 110 and/or the banking application 116 may comprise an authentication module (not shown) for authenticating the account holder prior to granting access to the account. The banking application 116 may be used by the account holder to perform various account-related functions, such as viewing transactions stored in the database 120, making payments, depositing checks, transferring funds, sending funds, etc. The banking application 116 may further be used to view additional information obtained by the spend tracking module 112, such as information about a merchant associated with a transaction, line item data associated with a transaction, and additional information associate with the line item data, such as return policy, warranty information, additional merchants selling the item, etc. The backing application 116 may further be used to access detailed spend tracking information generated by the spend tracking module 112.

The banking application 116 may be a server-based application installed and executed at the account server 110. The server-based banking application 116 may be accessed through a website, such as a banking website, by a client device, such as by the second user computing devices 130b. Additionally or alternatively, the banking application 116 may be a client-based application installed and executed on a client device, such as the first user computing device 130a.

The database 120 may store information used by the account server 110, the spend tracking module 112, the receipt analysis module 114, the banking application 116, and/or the one or more user computing devices 130. For instance, the database 120 may store information associated with a plurality of account holder's accounts, such as, but not limited to, transactions, line item data associated with the transactions, additional information associated with the line item data, and the like. The database 120 may additionally store information associated with a plurality of merchants, such as, but not limited to, merchant names, merchant locations, merchant websites, merchant contact information, merchant receipt templates. The database 120 may additionally store information associated with a plurality of products, such as a mapping of product or item identifiers to product names, a mapping of products to brands, or a mapping of products to corporate entities, and the like. The database 120 may additionally store tracking information associated with a number of occurrences where transaction data discrepancies were encountered between user receipt data and data received from payment processing systems. The database may store additional information including, but not limited to, personal information about the account holder, name, address, email address, phone number, security information, user preference information, and the like. The database 120 may comprise one or more of a relational database, a hierarchical database, a distributed database, an in-memory database, a flat file database, an XML database, a NoSQL database, a graph database, or the like.

The one or more user computing devices 130, e.g., first user computing device 130a and/or the second user computing device 130b, may be configured to communicate with and/or connect to one or more computing devices of the computing environment 100 via the public network 160. In some instances, the one or more user computing devices 130 may have installed thereon one or more applications for performing one or more aspects described herein. For instance, the first user computing device 130a may store an application, such as the banking application 116, for accessing a bank account, credit card account, commercial account, line of credit, or the like. In some instances, the one or more user computing devices 130 may access one or more applications installed on the account server 110 for performing one or more aspects described herein. For instance, the second user computing device 130b, may access, using a website, and via the public network 160, the banking application 114 installed at the account server 110.

The one or more user computing devices 130 may be any type of computing device or combination of devices capable of performing the particular functions disclosed herein. For example, the one or more user computing devices 130 may be and/or include server computers, desktop computers, laptop computers, tablet computers, smart phones, fitness devices, or the like that may include one or more processors, memories, communication interfaces, storage devices, and/or other components. The one or more user computing devices 130, in some instances, may be or include special-purpose computing devices configured to perform the functions disclosed herein. In some instances, some or all of the functionality of the account server 110 may be instead be performed by either of the one or more user computing devices 130 alone or in combination with the account server 110.

The image capturing device 140 may be a device for capturing an image. The image capturing device 140 may be used to capture one or more images of a receipt for use in extracting line item data for a corresponding transactions. In some cases, the image capturing device 140 may be integrated in another device, such as the one or more user computing devices 130. For instance, the image capturing device 140 may be one of one or more sensors of the one or more user computing devices 130, and one or more applications installed on the one or more user computing devices 130 may cause the image capturing device 140 to be activated and to capture an image or a video. The captured image and/or video may be stored on the one or more user computing devices 130 and/or on a different device. In some cases, the image capturing device 140 may be embodied separate from the one or more user computing devices 130. When separately embodied, the image capturing device 140 may, in some cases, be communicatively connected to the one or more user computing devices 130 and may be controlled by the one or more user computing devices 130. In some instances, the image capturing device 140, might not be integrated in or connected to the one or more user computing devices 130. In some instances, the image capturing device 140 may be communicatively connected to the public network 160 and may be configured to transmit images and/or videos to the one or more user computing devices 130, the account server 110, and/or to other devices via the public network 160.

The merchant computing device 150 may comprise a computing device associated with a merchant external to the organization or business, e.g., as a financial institution, that operates the private network 170. The merchant computing device 150 may be used by the merchant when a customer makes a purchase using a credit or other payment card. When the customer's card is swiped by the merchant during the purchase transaction, the merchant computing device 150 may receive approval for the purchase transaction from a payment processor system associated with the payment card. The merchant computing device 150 may maintain certain information associated with the purchase transaction, such as a transaction identifier, a purchase date and time, a purchase amount, and/or a payment card information. In some instances, more detailed information about the purchase may be maintained by the merchant, such as the individual items that were purchased during transaction. For instance, the merchant computing device 150 may store information for each purchased item in a transaction, such as an item identifier and/or name, a quantity of the item purchased, and/or an item purchase price. In some instances, the merchant computing device 150 may provide such information to a computing device associated with the financial institution issuing the payment card. For instance, the merchant computing device 150 may communicate, via the public network 160, with the private network 170, and the account server 110 and may send transaction information to the account server 110 automatically after each purchase transaction or upon request by the account server 110.

The private network 170 may be a network operated by, and internal to, an organization or business, such as a banking institution. The private network 170 may be used to interconnect one or more computing devices internal to the organization or business. The private network 170 may further connect to the public network 170. The private network 170 may include one or more of local area networks (LANs), wide area networks (WANs), virtual private networks (VPNs), and the like.

The public network 160 may connect the private network 170, and/or the one or more computing devices connected thereto, to one or more networks, systems, and/or computing devices that might not be associated with the organization, such as the one or more user computing devices 130 and the merchant computing device 150. The public network 160 may include one or more networks, such as the Internet.

Figure 2:
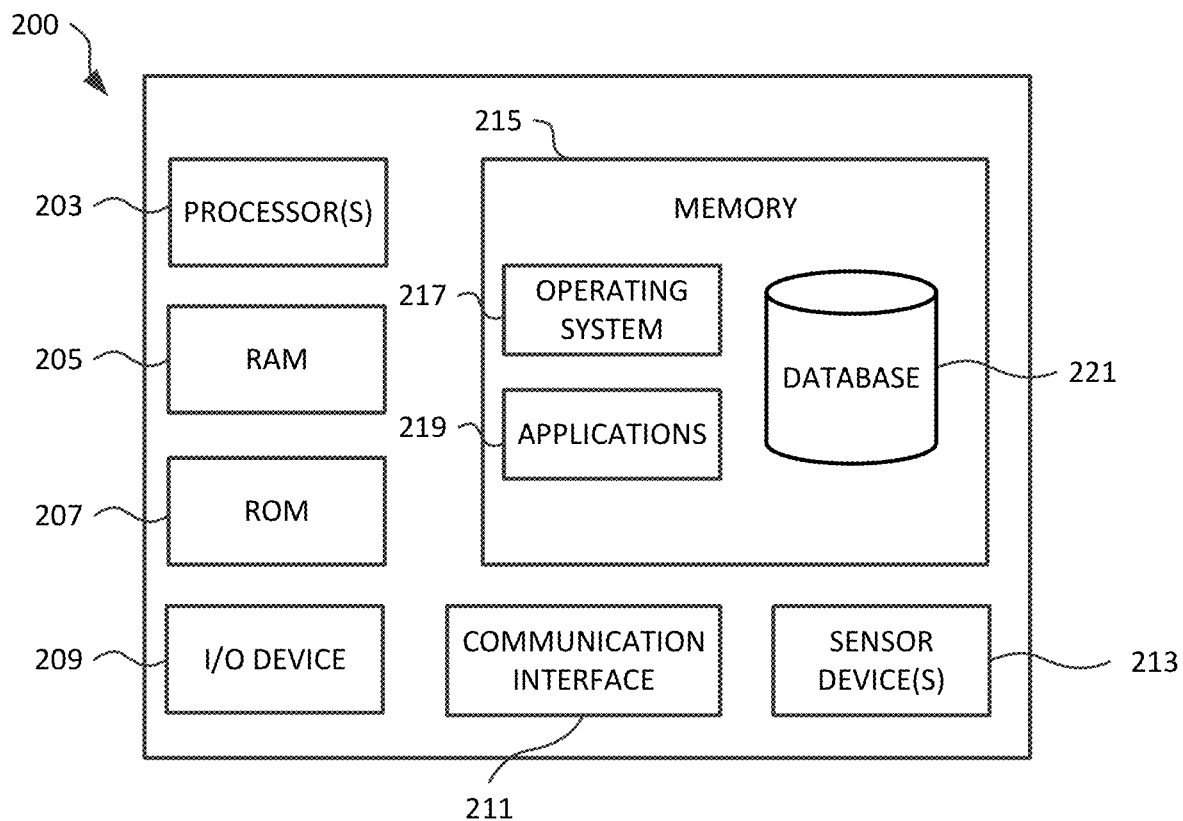
FIG. 2 illustrates an example computing device for use in an item-level data determination system, in accordance with one or more aspects described herein.

Referring to FIG. 2, an example computing device 200 is provided. The example computing device 200 may include or incorporate any one of the account server 110, the database 120, the one or more user computing devices 130, the image capturing device 140, the merchant computing device 150, the public network 160, and the private network 170. In some instances, the computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

The computing device 200 may include one or more components, such as one or more processors 203, a random access memory (RAM) 205, a read-only memory (ROM) 207, an input/output (I/O) device 209, a communication interface 211, one or more sensor devices 213, and a memory 215. The computing device 200 may include one or more additional or different components.

The one or more processors 203 may be configured to control overall operation of the computing device 200 and its associated components. A data bus (not shown) may interconnect the one or more processors 203, the RAM 205, the ROM 207, the memory 215, the I/O device 209, the communication interface 211, and/or the one or more sensor devices 211. The one or more processors 203 may include a single central processing unit (CPU), which may be a single-core or multi-core processor, or may include multiple CPUs. The one or more processors 203 and associated components may control the computing device 200 to execute a series of computer-readable instructions to perform some or all of the processes disclosed herein. Although not shown in FIG. 2, various elements within the memory 215 or other components in the computing device 200, may include one or more caches, for example, CPU caches used by the one or more processors 203, page caches used by operating system 217, disk caches of a hard drive, and/or database caches used to cache content from database 221. For embodiments including a CPU cache, the CPU cache may be used by the one or more processors 203 to reduce memory latency and access time. The one or more processors 203 may retrieve data from or write data to the CPU cache rather than reading/writing to the memory 215, which may improve the speed of these operations. In some examples, a database cache may be created in which certain data from the database 221 may be cached in a separate smaller database in a memory separate from the database 221, such as in the RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

The I/O device 209 may include, but need not be limited to, a microphone, keypad, touch screen, and/or stylus, through which a user of the computing device 200 may provide input, and may also include one or more of a speaker for providing audio output, and a video display device for providing textual, audiovisual, and/or graphical output.

The communication interface 211 may include one or more transceivers, digital signal processors, and/or additional circuitry and software for communicating via a network (e.g., the public network 160, the private network 170, or the like), wired or wireless, using any protocol as described herein.

The one or more sensor devices 213 may include one or more of an accelerometer, a gyroscope, a global positioning system (GPS), a biometric sensor, a proximity sensor, image capturing device, a magnetometer, and the like.

The memory 215 may store software to provide instructions to the one or more processors 203 allowing the computing device 200 to perform various actions. For example, the memory 215 may store software used by the computing device 200, such as the operating system 217, applications 219, and/or the database 221. The various hardware memory units in the memory 215 may include volatile and nonvolatile, removable and non-removable media implemented in any method or technology for storage of information, such as computer-readable instructions, data structures, program modules, or other data. The memory 215 may include one or more physical persistent memory devices and/or one or more non-persistent memory devices. The memory 215 may include, but need not be limited to, the RAM 205, the ROM 207, electronically erasable programmable read only memory (EEPROM), flash memory, or other memory technology, optical disk storage, magnetic cassettes, magnetic tape, magnetic disk storage or other magnetic storage devices, or any other medium that may be used to store the desired information and that may be accessed by the one or more processors 203.

Although various components of the computing device 200 are described separately, functionality of the various components may be combined and/or performed by a single component and/or multiple computing devices in communication without departing from the disclosure.

Figure 3A:
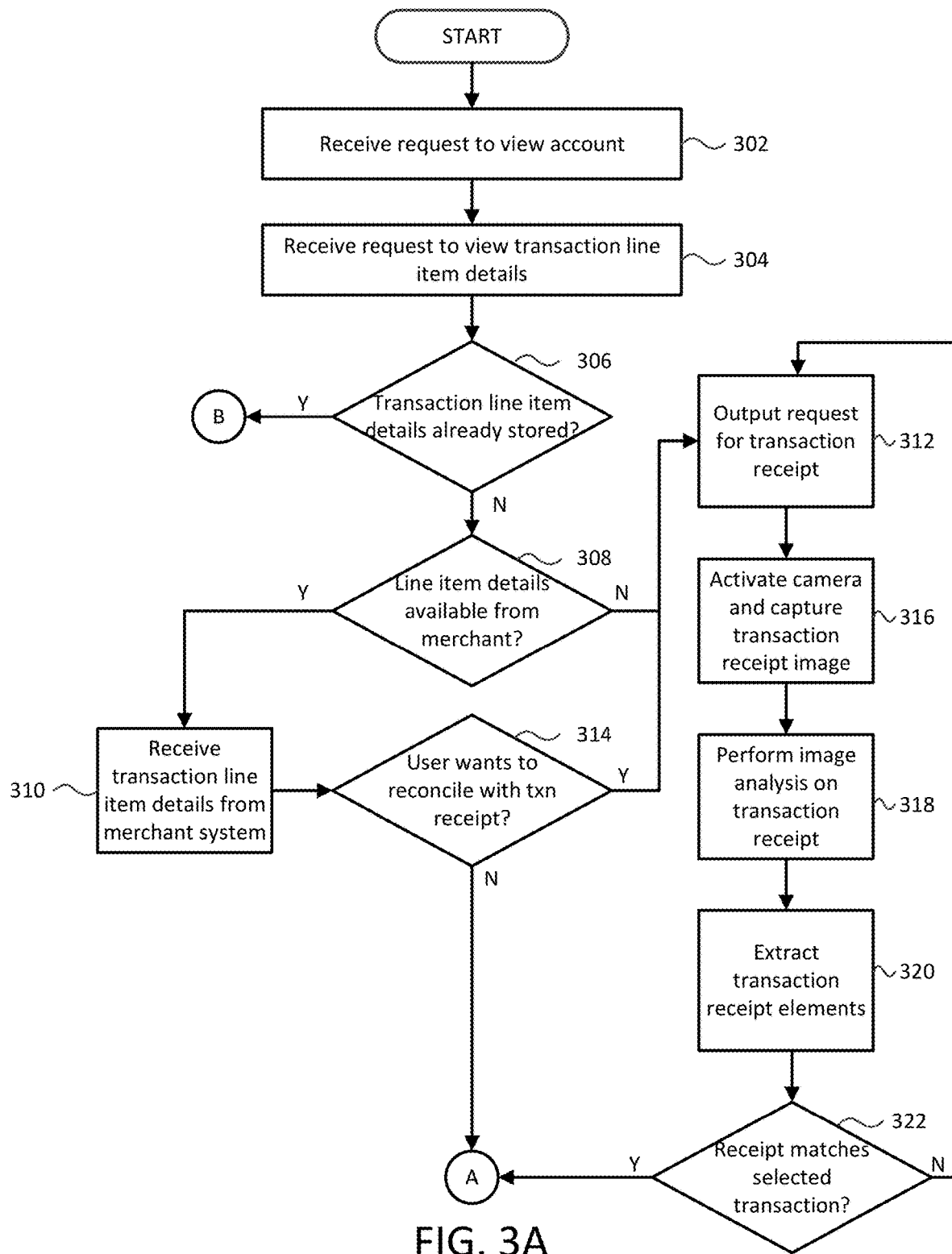
FIGS. 3A-3C are flowcharts of example methods of providing item-level data and additional information, in accordance with one or more aspects described herein.
Figure 3B:
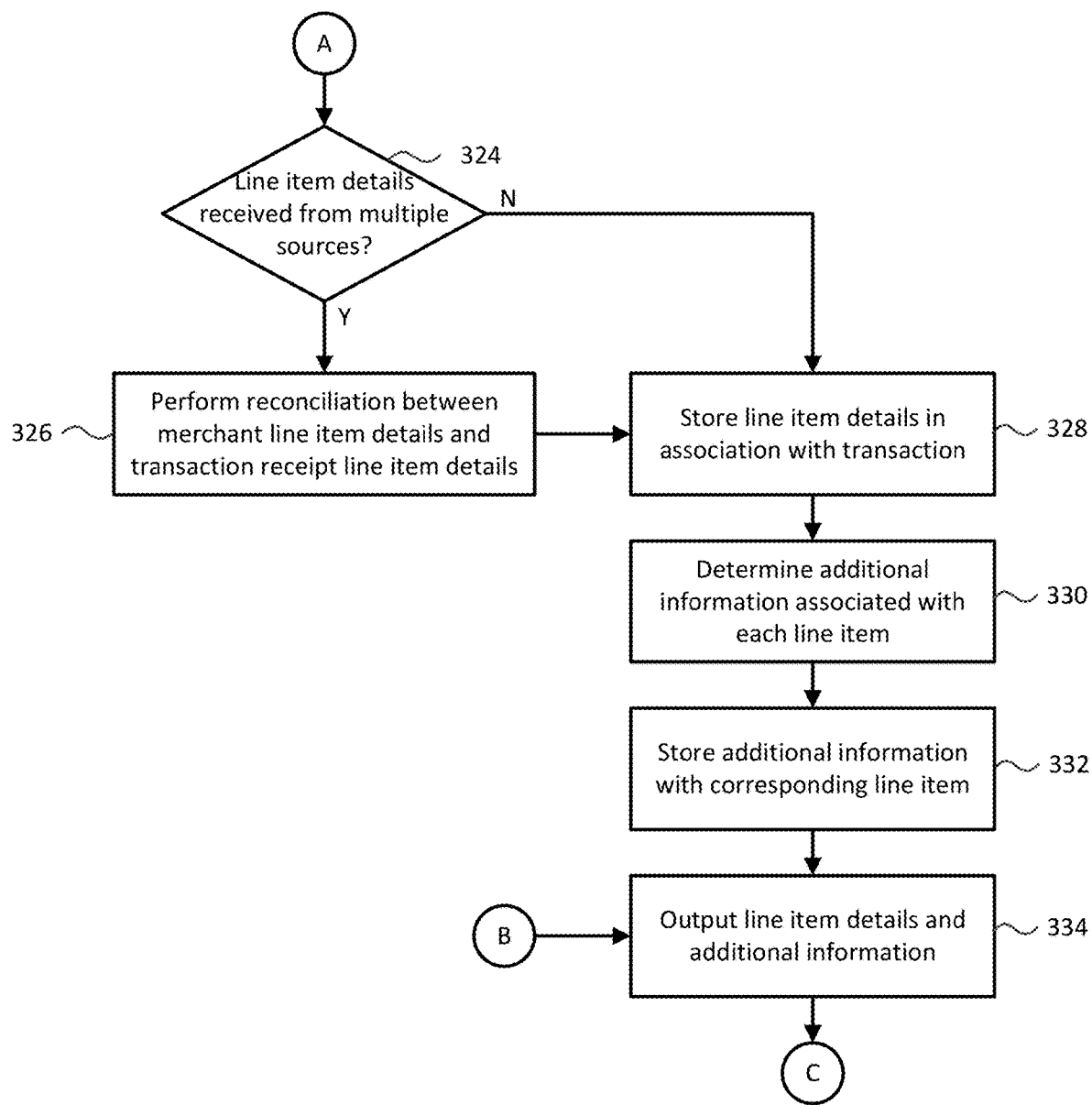
Figure 3C:
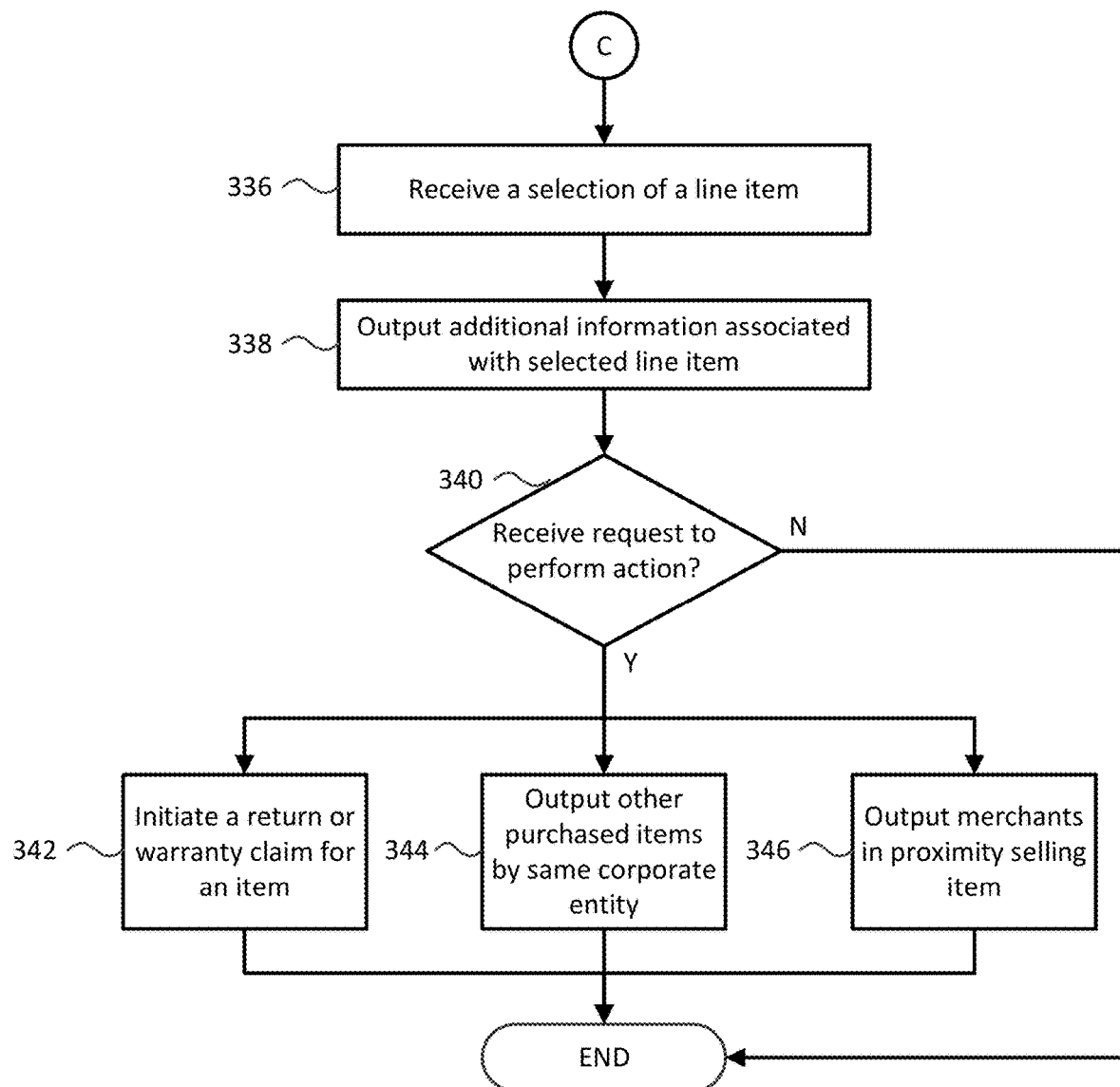

FIGS. 3A-3C disclose example methods of providing item-level data and additional information, via a banking application, in accordance with one or more aspects described herein. The example methods are described as being performed by the account server 110, however the example methods may be performed by any one of the account server 110, the one or more user computing devices 130, the computing device 200, and/or a combination thereof. FIGS. 5A-5K are example user interfaces of a banking application used by the example methods.

Figure 5A:
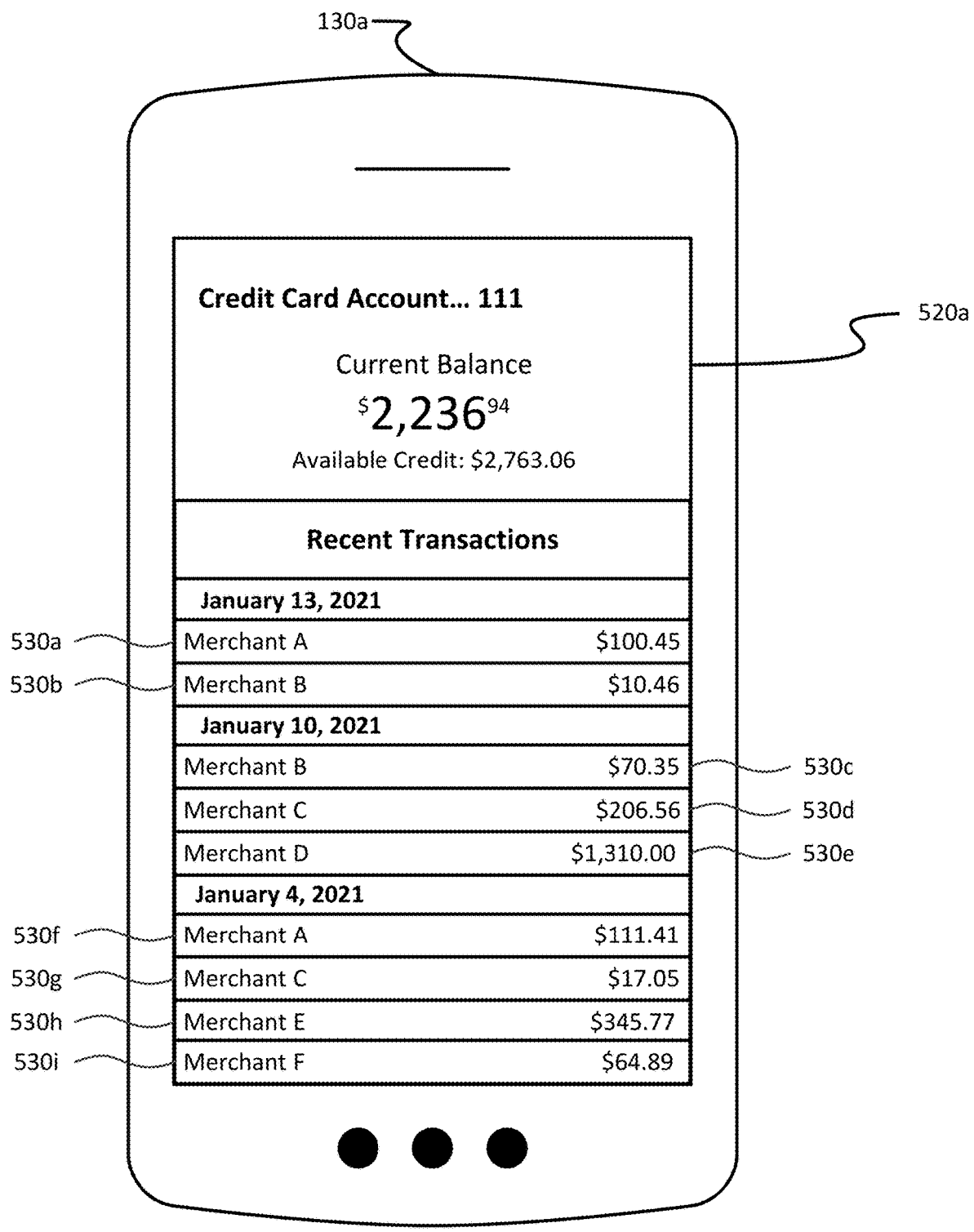
FIGS. 5A-5K are example user interfaces of an application used in an item-level data determination system, in accordance with one or more aspects described herein.
Figure 5B:
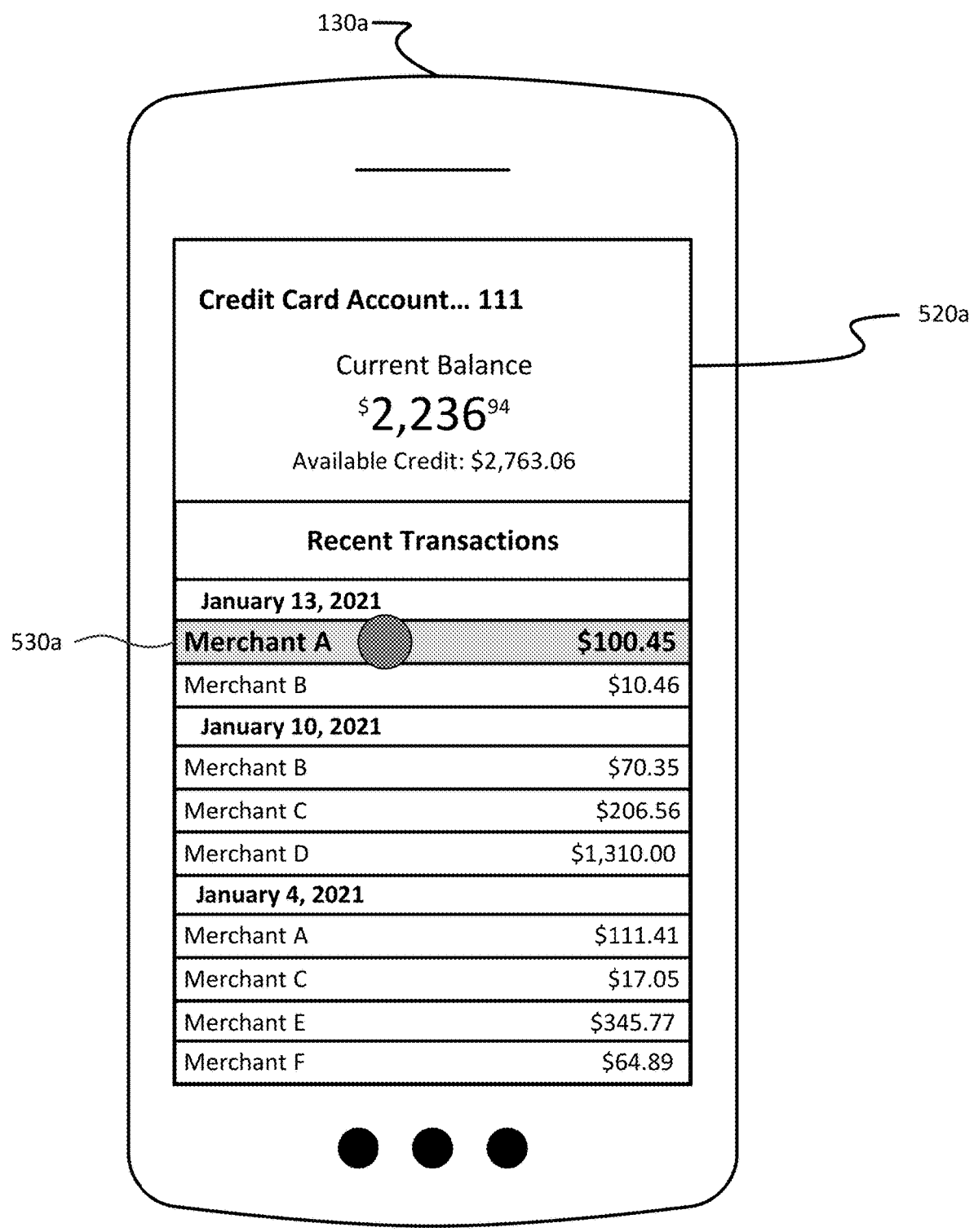

Referring to FIG. 3A, at step 302, the account server 110 may receive a request to view a transaction account, such as a bank account, a credit card account, a commercial account, a line of credit, or the like, maintained by a banking or other financial institution. The request to view the transaction account may be received via the banking application 116. For instance, an account holder having a credit card account with a banking institution may access the banking application 116 via the first user computing device 130a. The banking application 116 may be used by the account holder to perform various account-related functions, such as but not limited to viewing account-related transactions stored in the database 120. Referring to FIG. 5A, the account server 110 may cause the banking application 116 to output, on a display of the first user computing device 130a, a user interface 520a that displays recent transactions 530a-530i associated with the account holder's credit card account. The transactions 530a-530i may be purchase transactions from various merchants and the amounts shown may be total amounts for each of the transactions.

At step 304, the account server 110 may receive a request to view transaction line item data associated with one of the displayed transactions. The request to view the transaction line item data may be received from a user via the banking application 116. For instance, referring to FIG. 5B, the user may select one of the transactions, such as transaction 530a, displayed in the user interface 520a.

Figure 5C:
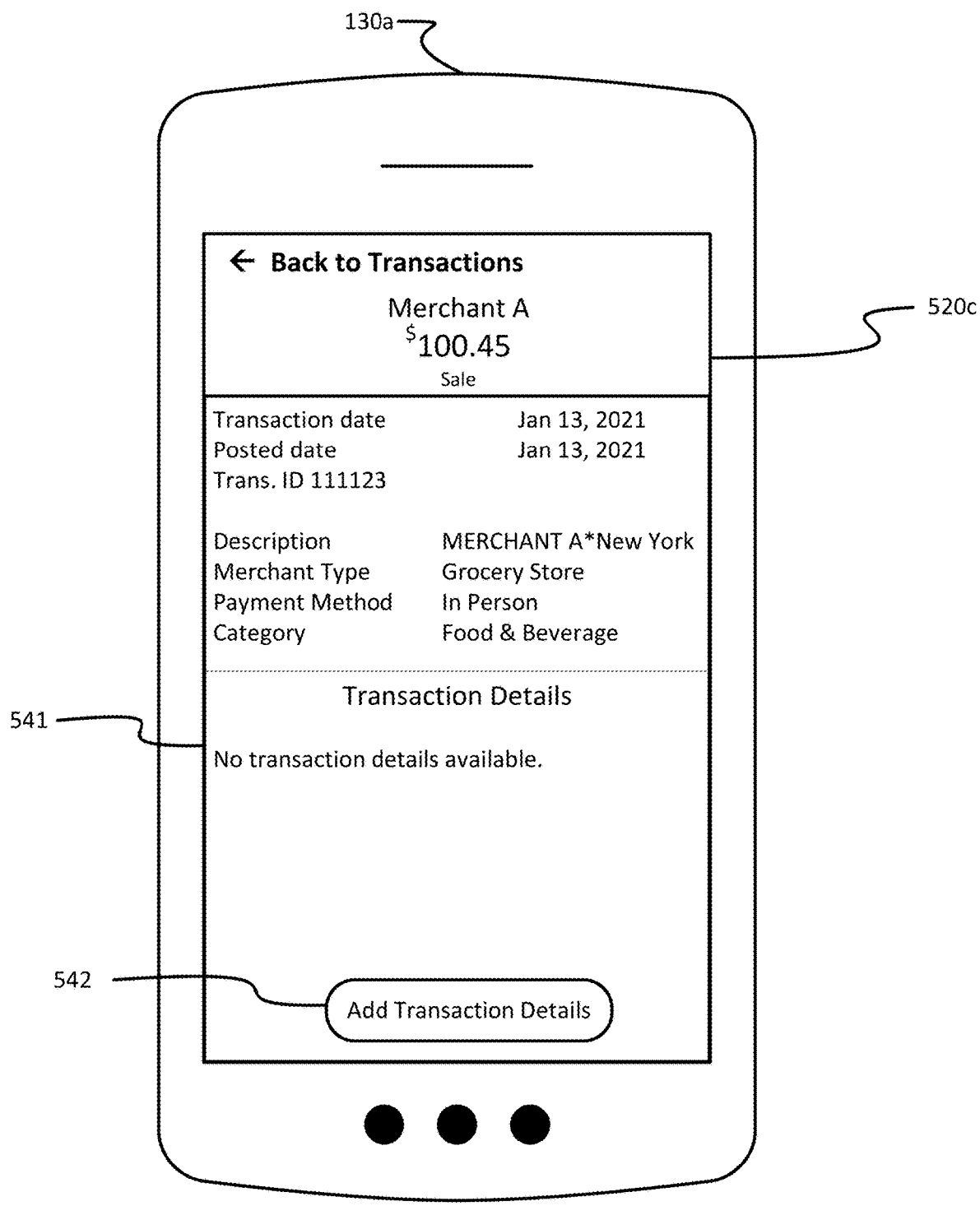
Figure 5D:
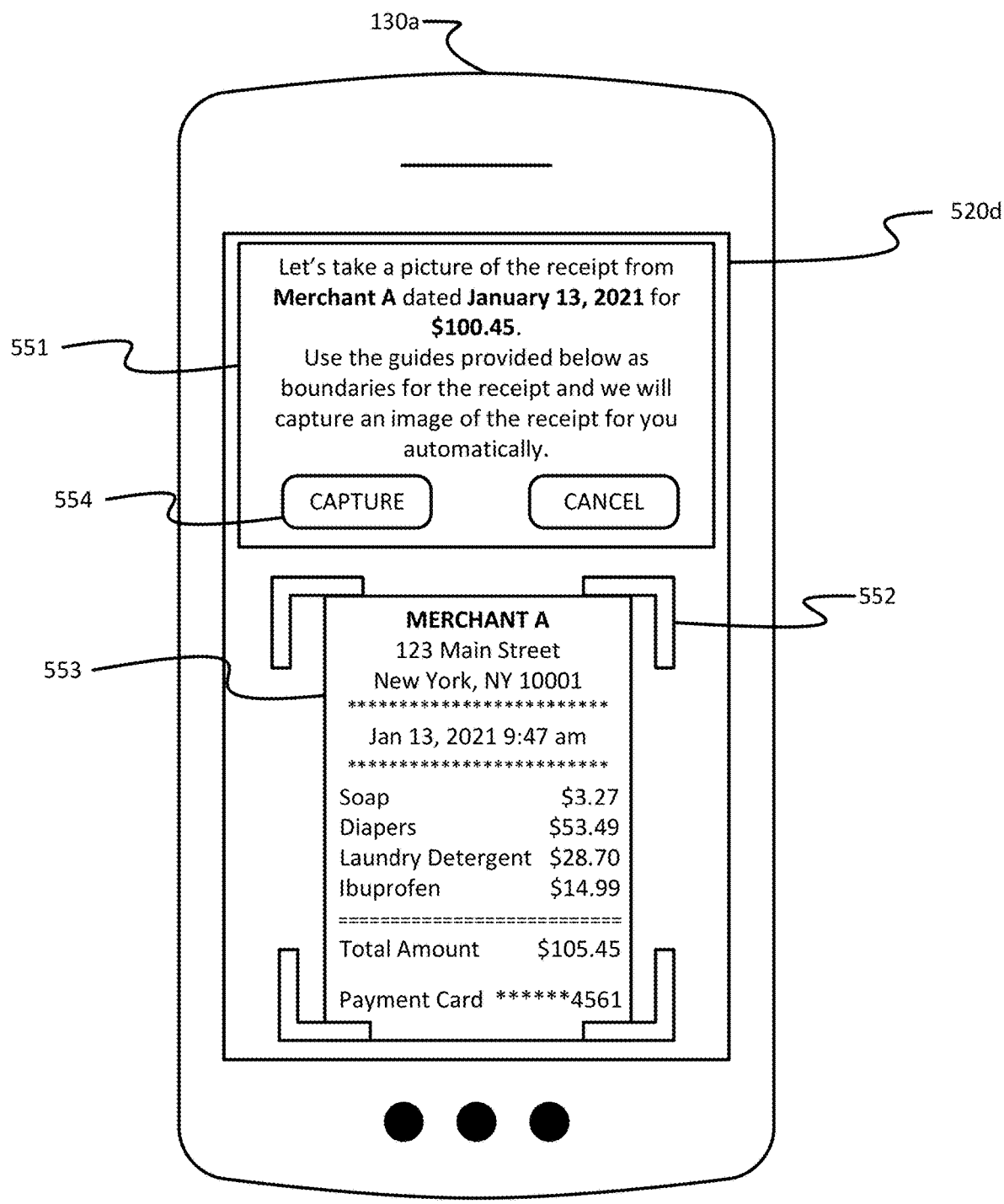

At step 306, the account server 110 may cause the banking application 116 to output, on a display of the first user computing device 130a, a user interface 520c that displays information about the transaction, such as shown in FIG. 5C. For instance, the account server 110 may control the spend tracking module 112 to query the database 120 to retrieve general information about the selected transaction, such as a transaction identifier, an amount of the transaction, dates associated with when the transaction took place and/or when the transaction was posted to the bank holder's account, description information associated with the merchant, and the like. Such information may have been received from the payment processor system, when the purchase transaction was initially approved, and stored in the database 120. The spend tracking module 112 may additionally query the database 120 to determine whether any line item data associated with the transaction is stored. For instance, because the payment processor system might not have access to individual line item data associated with a transaction, such information might not be provided by the payment processor system upon initial approval of the application and thus might not be stored in the database 120.

If the spend tracking module 112 determines that transaction line item data is already stored in the database 120, the spend tracking module 112 may proceed to step 334 shown in FIG. 3B to output the line item data and corresponding additional information.

If the spend tracking module 112 determines that the transaction line item data is not already stored in the database 120, the spending tracking module 112 may output a notification regarding the same via a user interface of the banking application 116, such as notification 541 shown in user interface 520c of FIG. 5C. In some instances, the notification may further include a means for the user to request that transaction line item details be added, such as button 542. If the user, requests that the transaction line item details be added, the spend tracking module 112 may proceed to step 308. In some instances, the notification 541 is not displayed to the user to inform the user that the transaction line item details are not stored in the database 120. In this case, the spend tracking module 112 may proceed directly to step 308 without any interaction or input from the user.

At step 308, the spend tracking module 112 may determine whether a merchant computing device 150 associated with a merchant associated with the selected transaction has access to the line item data. For instance, some merchants may maintain details about the individual items purchased during a transaction. The spend tracking module 112 may send a request to the merchant computing device 150 for the line item data. The request may include information identifying the transaction, such as one or more of a transaction identifier, a merchant name coupled with a merchant state, city, and/or zip code, a transaction amount, a payment card number, or the like.

If the transaction line item data is available from the merchant computing device 150, then at step 310, the spend tracking module 112 may receive the transaction line item data from the merchant computing device 150. In some instances, the merchant might not maintain line item data for transactions.

If the transaction line item data is not available from the merchant, then a notification regarding the same may be output via a user interface of the banking application 116. The notification may be similar to the notification 541, such as shown in user interface 520c of FIG. 5C. In some instances, the notification 541 may further include a means for the user to request that transaction line item details be added, such as button 542 shown in user interface 520c of FIG. 5C. If the user requests that the transaction line item details be added, the spend tracking module 112 may proceed to step 312. In some instances, the notification 541 is not displayed to the user to inform the user that the transaction line item details are not available from the merchant. In this case, the spend tracking module 112 may proceed directly to step 312 without any interaction or input from the user.

At step 312, the spend tracking module 112 may output a prompt asking the user to submit a user-provided transaction receipt associated with the selected transaction. The user-provided transaction receipt may be used by the spend tracking module 112 to extract line item data for the selected transaction. The prompt, such as prompt 551 shown in FIG. 5D, may be output via a user interface of the banking application 116, shown in user interface 520d of FIG. 5D. The prompt 551 may further provide instructions on how to capture an image of the transaction receipt. The spend tracking module 112 may output, to the user interface 520d shown in FIG. 5D, guides 552 that may be used for guidance in focusing the image capturing device 140 on the transaction receipt. The prompt 551 may instruct the user to place the transaction receipt such that the receipt is visible and focused within the provided guides 552.

In some instances, the spend tracking module 112 may output the prompt 551 asking the user to submit a user-provided transaction receipt associated with the transaction in cases where the user would like to reconcile merchant-received line item data with line item data provided by the user's transaction receipt. For instance, if the transaction line item details were received from the merchant computing device 150 at step 310, then at step 314, the spend tracking module 312 may output a prompt asking the user if she would like to reconcile the merchant-received line item details with a user-provided transaction receipt.

If the spend tracking module 112 determines that the user wants to reconcile the merchant-received line item data with the user-provided transaction receipt, then at step 312, the spend tracking module 112 may output the prompt 551 asking the user to submit the user-provided transaction receipt. For instance, because merchants might not be required to maintain details regarding the individual products or items purchased during a transaction, and often might not, there might not be a standard or uniform practice of what information should be maintained. As a result, different merchants may maintain different information if they maintain information at all. For instance, one merchant may maintain for each transaction product name, quantity of product purchased, and product purchase price, while another merchant may only maintain a product number or other identifier of each product purchased. In these cases, to have a more thorough and complete picture of spending, the user may choose to submit an image of a receipt for the transaction to fill in any gaps associated with the merchant-provided data.

If the spend tracking module 112 determines that the user does not want to reconcile the merchant-received line item data with the user-provided transaction receipt, then the spend tracking module 112 may proceed to step 324 shown in FIG. 3B, where the spend tracking module 112 may confirm that the line item details were not received from two sources (e.g., the merchant and the user transaction receipt) and, at step 328 may store, in the database 120 and in association with the transaction selected in step 305, the line item data received from the merchant computing device 150.

Returning to FIG. 3A, at step 316, the spend tracking module 112 may control the first user computing device 130*a* to activate the image capturing device 140 and to capture an image of the transaction receipt. In some cases the image may be captured in response to the user making a selection to capture the image, such as by selecting the 'capture' button 554 output with the prompt 551, such as shown in the user interface 520*d* of FIG. 5D. In other instances, the image may be captured automatically when the image capturing device 140 detects that a transaction receipt, such as receipt 553, is visible and focused within the guides 552, as shown in user interface 520*d*. The captured image may be uploaded to the account server 110 and stored in the database 120.

At step 318, the account server 110 may control the receipt analysis module 114 to analyze the captured image. The receipt analysis module 114 may use one or more image analysis and/or computer vision techniques, such as OCR, object recognition, or the like to convert the image of the transaction receipt into text and/or one or more objects in the manner described above with respect to FIG. 1.

At step 320, after converting the image of the transaction receipt to text, the receipt analysis module 114 may analyze the converted text to extract, from the text, the various elements that make up the receipt. As described above with respect to FIG. 1, the receipt analysis module 114 may use a template to extract the elements of the receipt from the text. For instance, the receipt analysis module 114 may query the database 120 to retrieve a template associated with the merchant associated with the transaction selected in step 305. The template may specify the receipt format that the merchant uses. For instance, the template for Merchant A may specify the receipt format for Merchant A's receipts, such as receipt 553 shown in user interface 520*d* of FIG. 5D. The template may indicate, for example, that the first line of a Merchant A receipt comprises the merchant name, the second line comprises the merchant address, the third line comprises the merchant city, state, and zip, lines four and six comprise blank lines or extraneous text, line five comprises the transaction date and time, and line seven begins the transaction line item details. The template may further specify a format of each line item detail. For example, the Merchant A template may specify that each line item on a Merchant A receipt begins with an item identifier, an item name, e.g., the name of the product purchased, followed by an amount paid for the item. The template may specify that the amount paid may be identified by, for example, a dollar sign character (e.g., "$") and may be distinguished by a predetermined format, such as "$xxx.xx". The template may further specify, for example, that a line comprising a predetermined string of characters, such as all equal signs (e.g., "======="), may indicate an end of the transaction line details. The template may further specify, for example, that the line after such string of characters comprises the total amount of the transaction, and the line thereafter, for example, comprises the payment card account number. Accordingly, the receipt analysis module 114 may use the template to perform the extraction of the transaction receipt elements from the converted text of the transaction receipt.

In some instances, there might not be a template stored in the database 120 for the merchant associated with the transaction selected in step 305. In such cases, the receipt analysis module 114 may identify the various elements of the receipt (e.g., the merchant name, merchant city, state, zip, line item details, total amount, etc.) using various machine learning models and/or algorithms. For instance, as detailed above with respect to FIG. 1, the receipt analysis module 114, using the machine learning models and/or algorithms, may detect a layout of the receipt during image analysis and/or certain clusters of text on the image of the receipt, and may make certain predictions to identify the receipt elements included therein. The receipt analysis module 114 may generate a new template based on such analysis and may associate the new template with the corresponding merchant and store in the database 120.

At step 322, the receipt analysis module 114 may use the extracted receipt elements corresponding to the merchant name, the merchant city, the merchant state, the merchant zip code, the date and time of the transaction, the total amount of the transaction, the payment card account number, and/or other information to confirm that the transaction receipt submitted by the user corresponds to the transaction for which the line item details were originally sought at step 305. To this end, the spend tracking module 112 may use such information extracted by the receipt analysis module 114 to compare to the transaction stored in the database 120. The spend tracking module 112 may determine that the submitted transaction receipt corresponds to the transaction selected at step 305 when one or more of the merchant name, the merchant city, the merchant state, the merchant zip code, the date and time of the transaction, the total amount of the transaction, and/or the payment card account number extracted from the submitted transaction receipt match with the corresponding information stored in the database 120. If the spend tracking module 112 determines that the receipt does not correspond to the transaction selected at step 305, the spend tracking module 112 may reject the submitted transaction receipt and may notify the user that the transaction receipt does not match the details of the selected transaction. The spend tracking module 112 may return to step 312 and may suggest that the user submit another receipt.

If the spend tracking module 112 determines that the receipt does correspond to the transaction selected at step 305, the receipt analysis module 114 may proceed to step 324, shown in FIG. 3B, to determine whether line item details where received from multiple sources (e.g., a merchant computing device and the user-provided receipt).

If the spend tracking module 114 determines that line item details were received from multiple sources, then at step 326, a reconciliation process may be performed to avoid redundant line item data being associated with the selected transaction in the database 120. In this case, the line item data from the multiple sources may be compared, and data missing from line item data from one source (e.g., the line item data received from the merchant computing device 150) may be supplemented by line item data available from another source (e.g., the line item data extracted from the user-provided receipt). When different data for the same receipt element is identified between multiple sources, the spend tracking module 112 may employ various rules to determine which source's data should be maintained. The rules may specify, for example, that for merchants for whom transaction data discrepancies are never encountered or encountered less than a threshold amount of times, the merchant data should be maintained. While merchants for whom transaction data discrepancies are encountered more than or equal to the threshold amount of times, the receipt data should be maintained. After reconciling the line item data from the multiple sources, the spend tracking module 112 may proceed to step 328 to store the reconciled line item data.

If the spend tracking module 114 determines at step 324 that the line item data was not received from multiple sources, then the spend tracking module 112 may proceed to step 328 to store the line item data (e.g., the line item data received from the merchant computing device 150 or the line item data extracted from the user transaction receipt).

At step 328, the spend tracking module 112 may store, in the database 120 and in association with the transaction selected at step 305, the line item data received from the merchant computing device 150, the line item data extracted from the user-provided receipt, or the reconciled line item data.

At step 330, the spending tracking module 112 may determine additional information related to each of the stored line items. For instance, the spend tracking module 112 may determine additional information associated with the merchant or the products associated with the line item data. The additional information may include contact information for the merchant, such as a phone number, a website, store hours and/or an email address. The additional information may further include information on a return policy associated with merchant. The additional information may further include information about the individual item or product, such as a full product name, a brand name associated with the product, or a corporate entity associated with the product, such as a parent, subsidiary, or affiliate entity, a return policy associated with the particular item (e.g., some merchants may have a store level return policy and different policies for particular items), or warranty information associated with the item.

The spend tracking module 112 may obtain some or all of the additional information by querying one or more databases or devices associated with the merchant and/or a third party. The spend tracking module 112 may obtain or request the additional information from the one or more databases or devices using identifying information about the merchant, such as a merchant name coupled with a city, state, and/or zip code of the merchant, or identifying information about the item, such as an item identifier.

Additionally or alternatively, the spend tracking module 112 may obtain some or all of the additional information by analyzing a webpage associated with the merchant, the product, a brand associated with the product, a corporate entity associated with the product, or the like. The spend tracking module 112 may use web scraping techniques to obtain the information. For instance, the spend tracking module 112 may use one or more scripts configured to identify certain words on the web page, such as "contact us," "for more information," "return policy," "return process," "warranty claim," and the like and to extract corresponding information. In some instances, the script may be configured to access links on the web page to obtain the necessary information. The spend tracking module 112 may further use machine learning to recognize the different elements on the webpage.

At step 332, the spend tracking module 112 may store the determined additional information with the corresponding line item data in the database 120. In some instances, the additional information may be stored separately from the corresponding line item data. For instance, the additional information related to the merchant may be stored separately from the corresponding line item data to avoid redundancy.

Figure 5E:
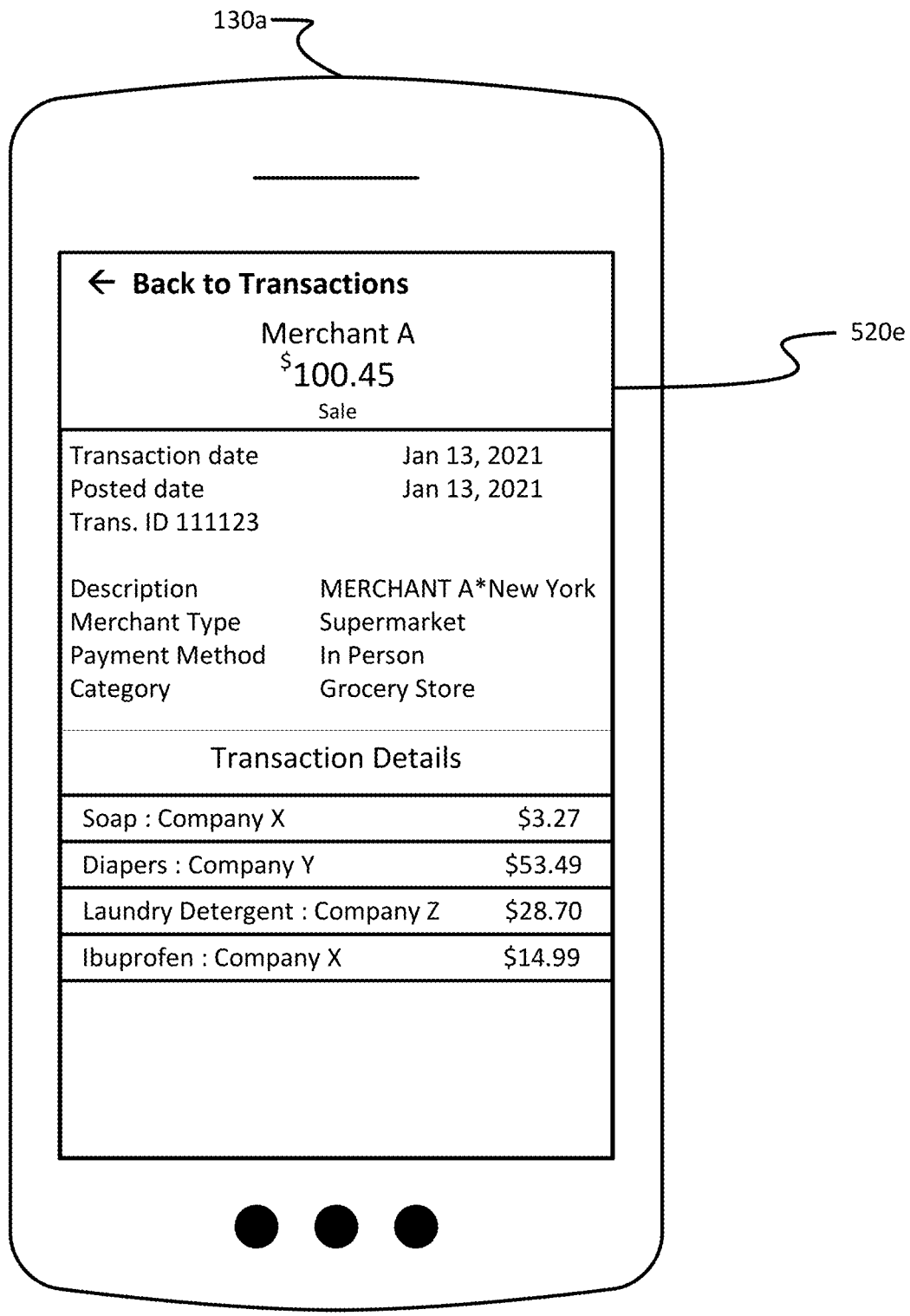

At step 334, the spend tracking module 112 may output, to a user interface of the banking application 116, such as user interface 520e shown in FIG. 5E, the line item data associated with the transaction selected in step 305 and some or all of the corresponding additional information associated with the line item data.

Figure 5F:
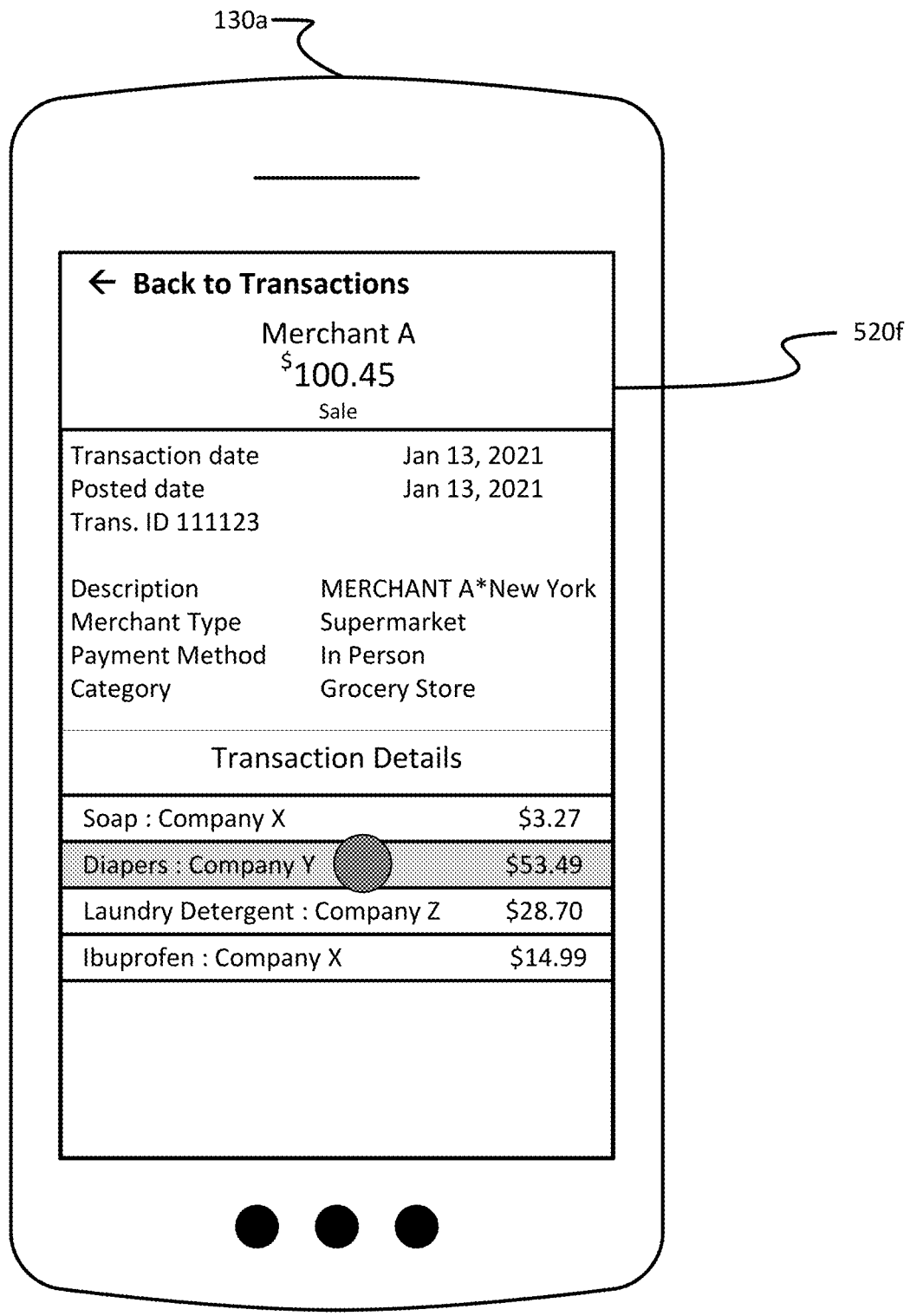
Figure 5G:
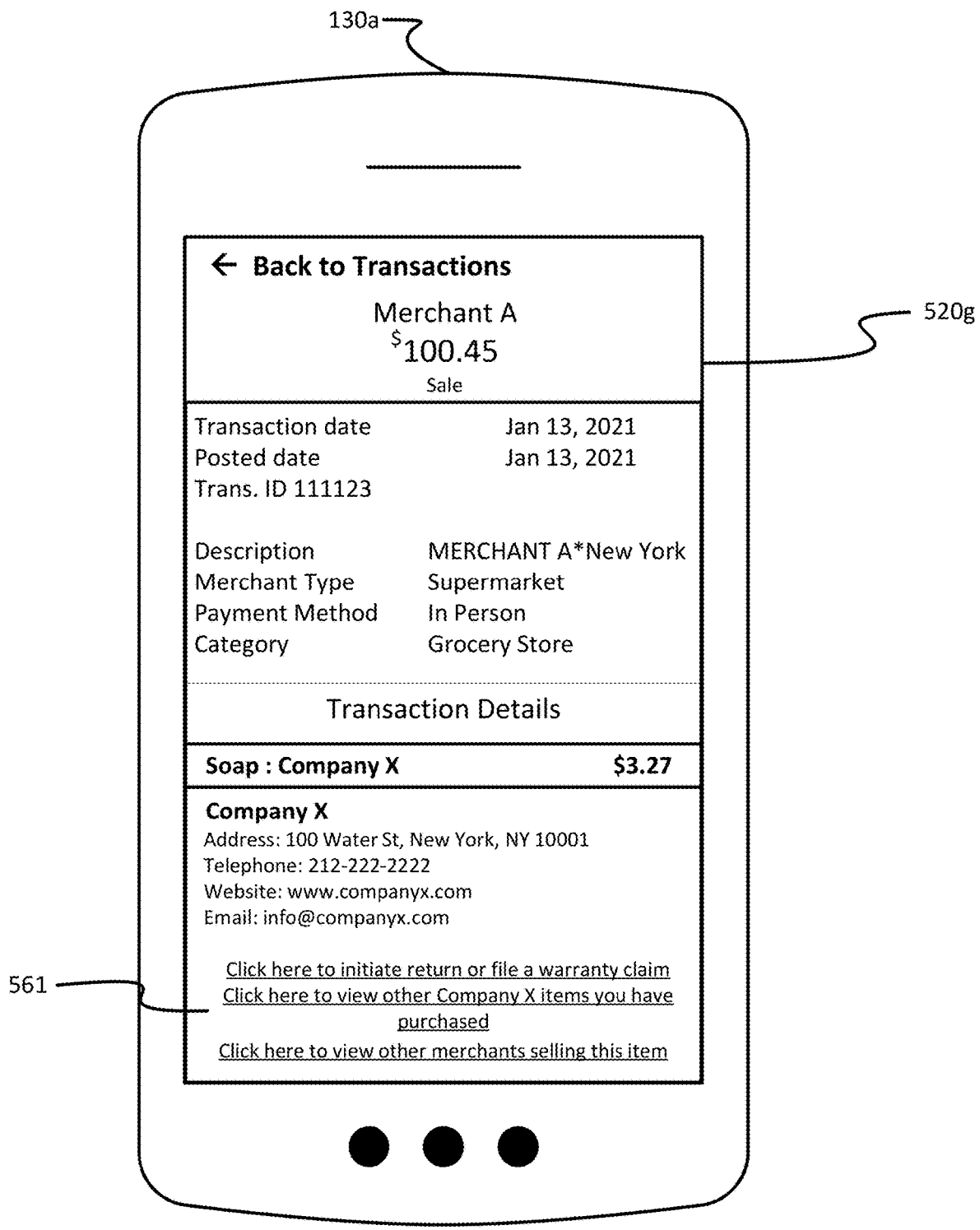
Figure 5H:
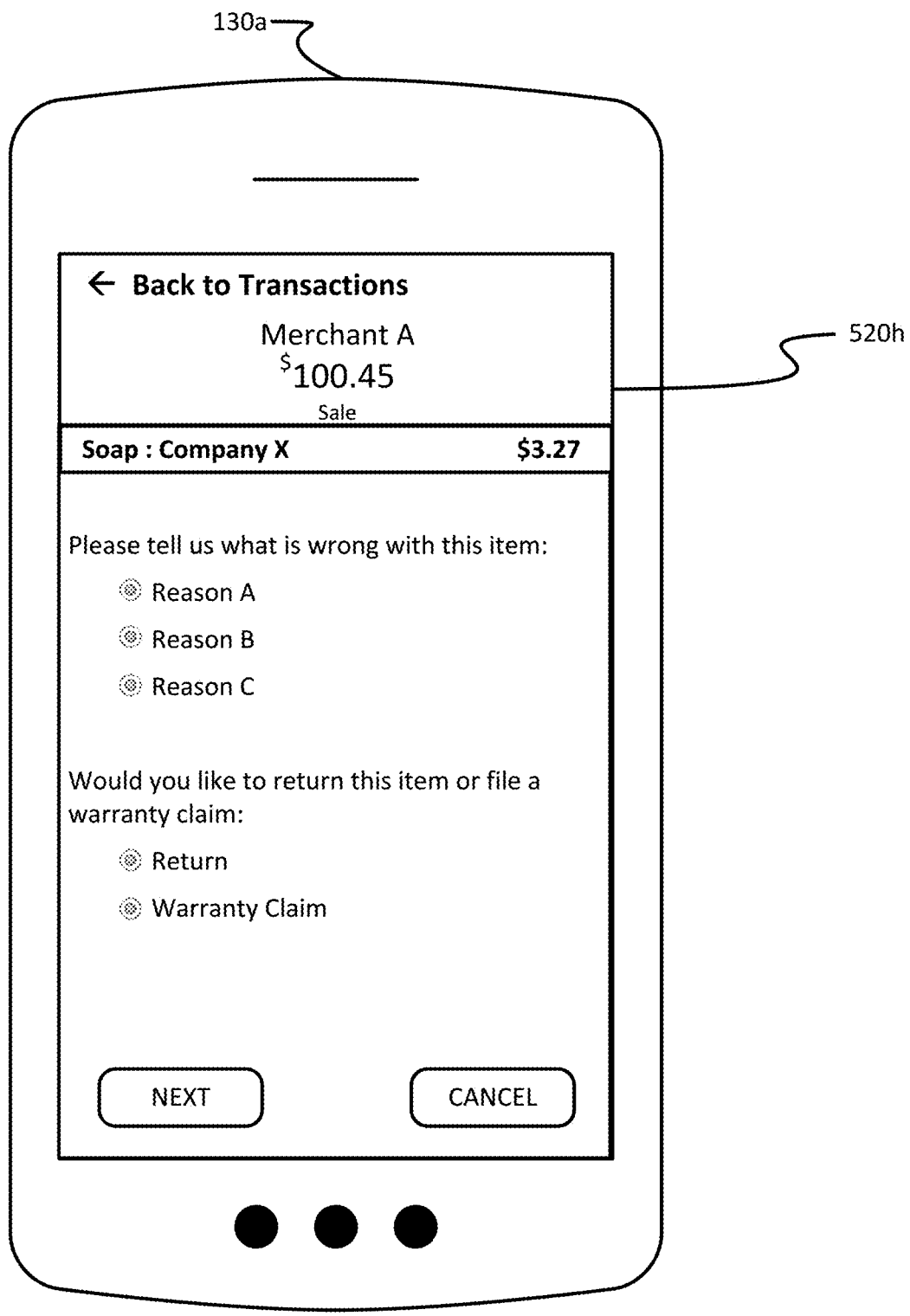
Figure 5I:
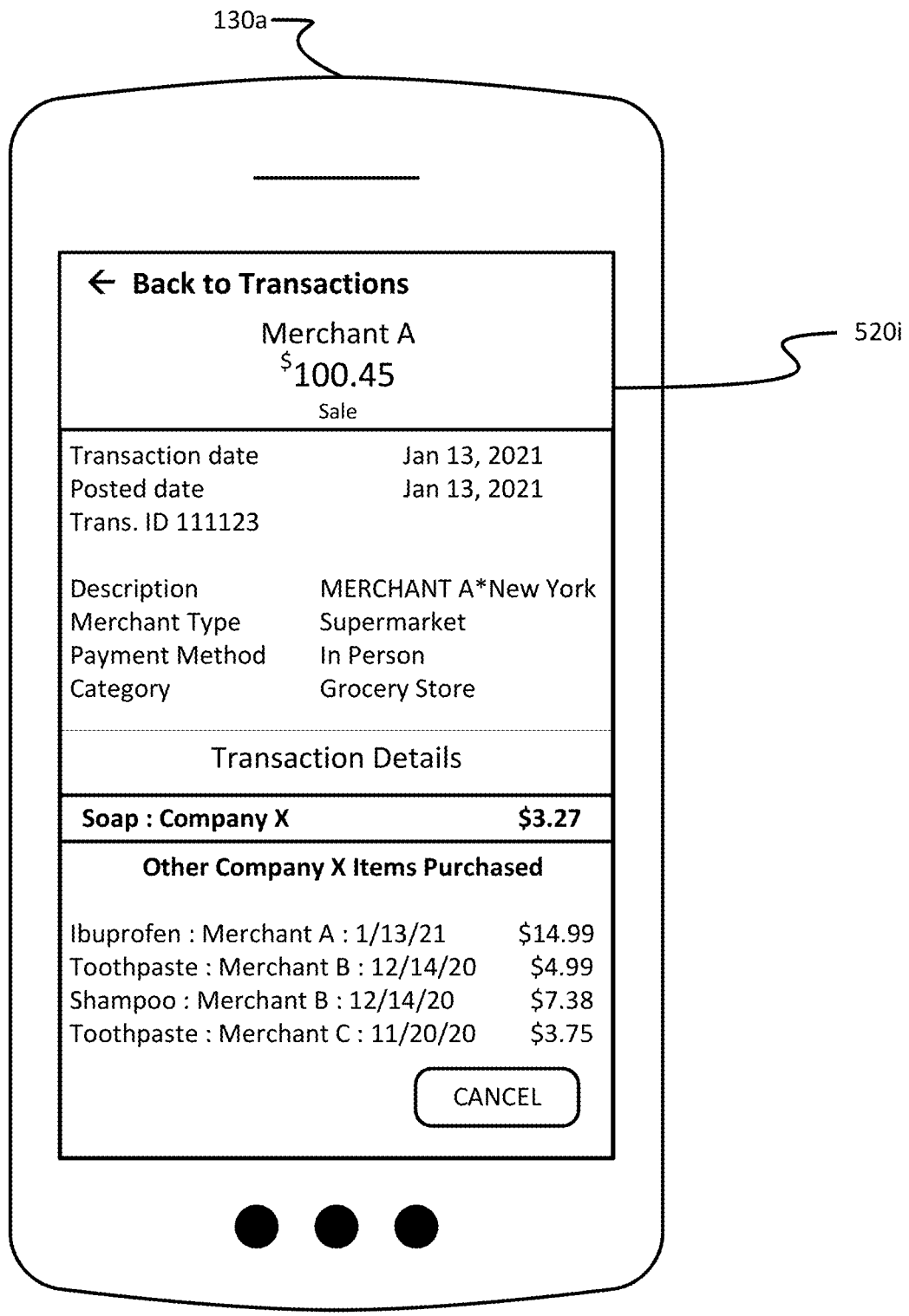
Figure 5J:
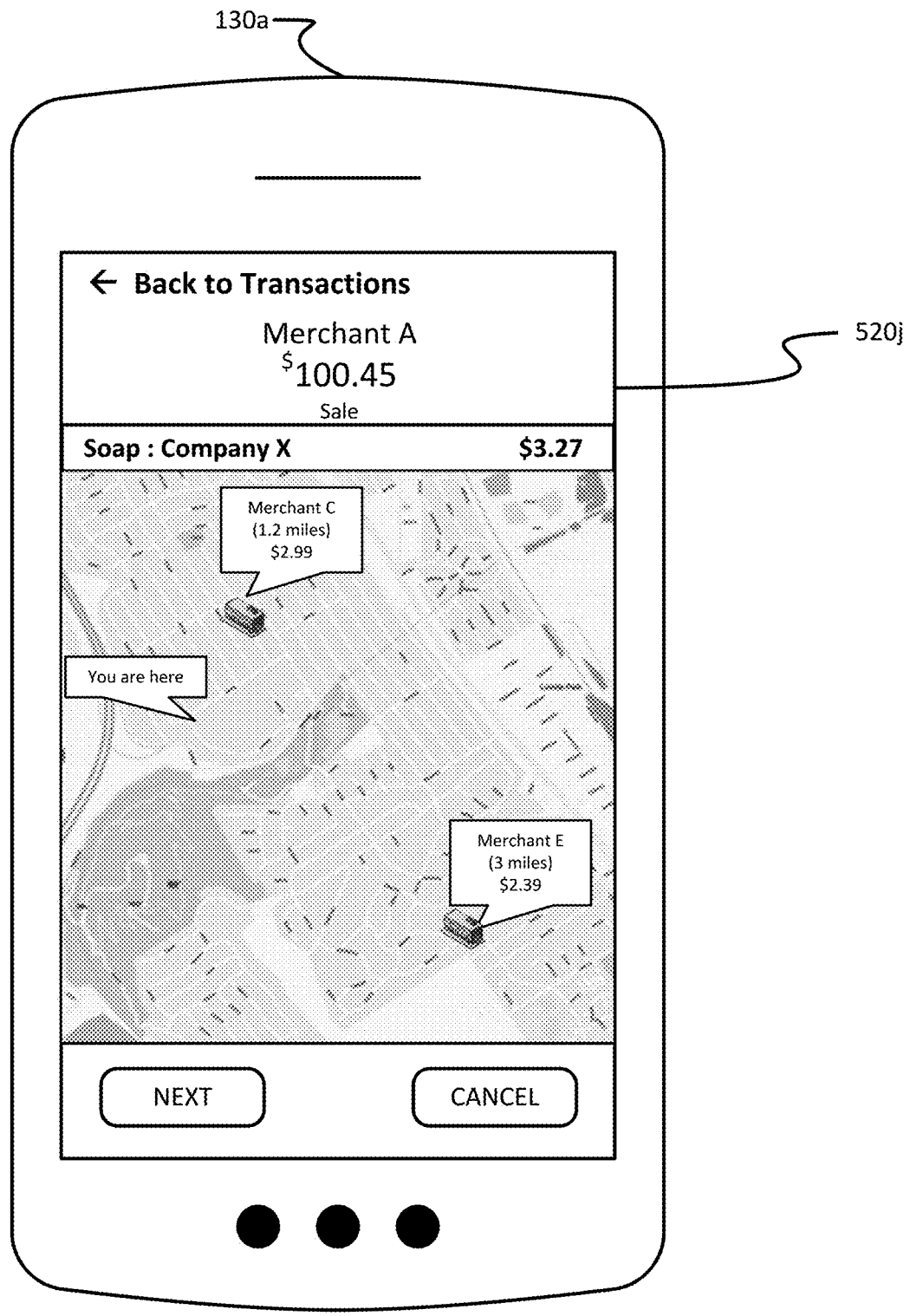
Figure 5K:
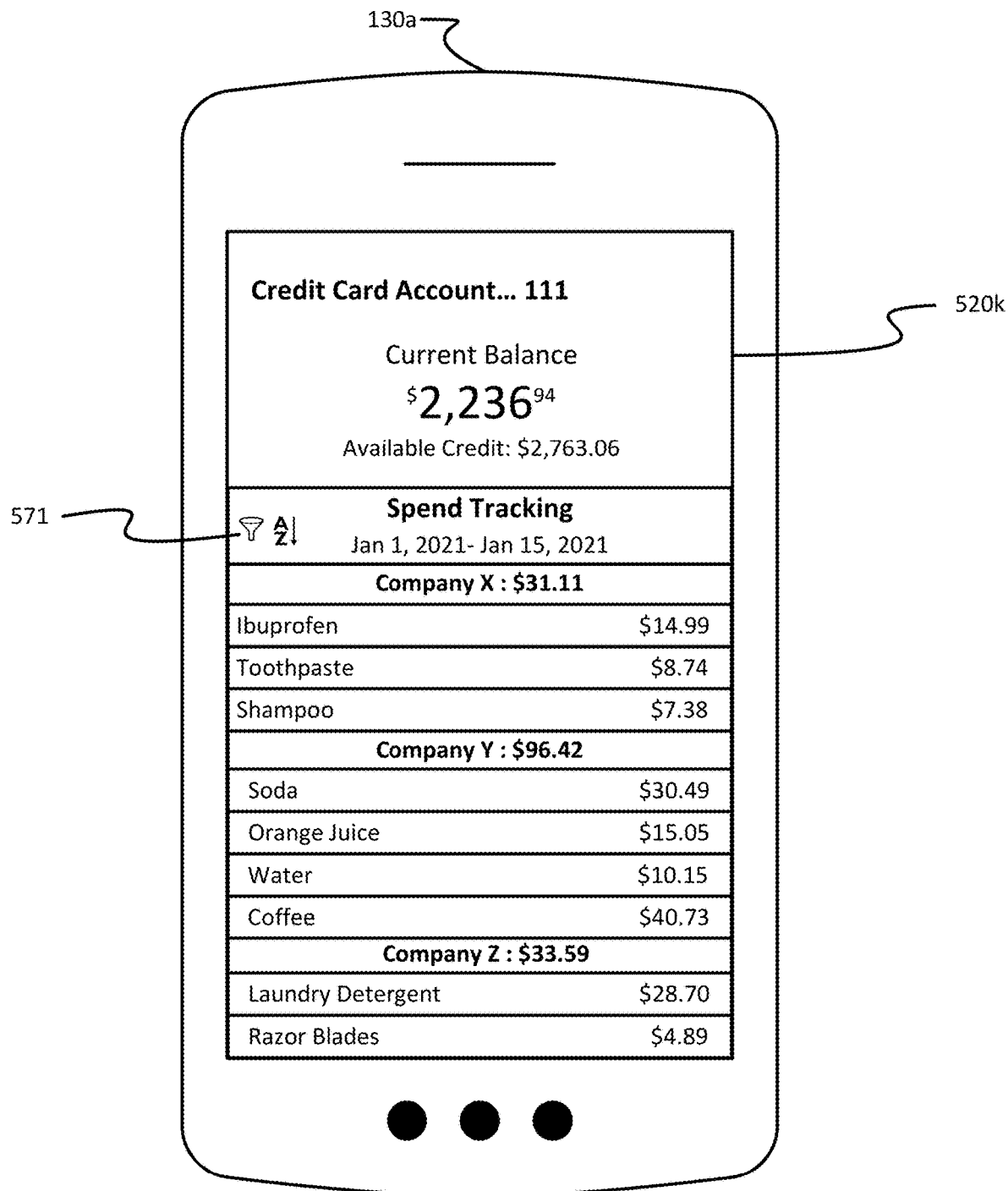

Referring to FIG. 3C, at step 336, the spend tracking module 112 may receive a selection of a line item output via a user interface of the banking application 116, such as user interface 520f shown in FIG. 5F.

In response to the selection, at step 338, the spend tracking module 112 may output further additional information associated with the selected line item. For instance, the spend tracking module 112 may output a user interface to the banking application 116, such as user interface 520g shown in FIG. 5G. The additional information may further be accompanied by one or more options 561 for performing certain actions with respect to the selected item.

At step 340, the spend tracking module 112 may receive a user selection to perform one of the one or more options 561. For instance, the user may press a button or a link to access a user interface to perform an action associated with the selection option 561.

For instance, at step 342, the spend tracking module 112 may receive a selection to initiate a return or a warranty claim for the selected item. In this case, the spend tracking module 112 may output, based on the additional information determined in step 330, a link to a webpage for initiating the return or warranty claim. In some instances, the spend tracking module 112 may employ one or more scripts to analyze, in one or more background processes, the web page or pages associated with a return process or a warranty claim for the selected item and may identify necessary form fields or other information for initiating the return or warranty claim. In the one or more background processes, the spend tracking module 112 may automatically populate such fields and initiate the return or warranty claim for the selected item without user input and without the webpages associated with the return process or the warranty claim being output to the user. In some instances, when user input is necessary, the spend tracking module 112 may, having analyzed the return process and warranty claim web pages, generate a user interface that may output prompts for the user to provide any necessary input or information. The user interface, such as user interface 520h shown in FIG. 5H, may be output in the banking application 116 so as to provide the user with a native banking application experience and to remove the need for the user to navigate away from the banking application 116 to enter information to initiate the return process or warranty claim. The spend tracking module 112, using the input provided by the user via the user interface 520h, may in the one or more background processes automatically populate fields in the return process and warranty claim and initiate the return or warranty claim without the return process and warranty claim webpages being output to the user.

At step 344, the spend tracking module 112 may receive a selection to output other items purchased by the user that are associated with the same corporate entity as the selected item. In this regard, the spend tracking module 112 may query the database 120 to retrieve line item data having additional information corresponding to the same corporate entity as the selected item. In some cases, the selection to output the other purchased items may further include a start and an end date for use in retrieving the items that where between the specified state and end dates. The spend tracking module 112 may output a user interface to the banking application, such as user interface 520i shown in FIG. 5I, of a list of the other items purchased and associated with the same corporate entity as the selected item. The list may include further information, such as information of a merchant from which the other item was purchased, a date of purchase, a purchase price, a quantity, and the like.

At step 346, the spend tracking module 112 may receive a selection to output merchants that are selling the selected item. The spend tracking module 112 may query one or more databases associated with one or more merchants or with third parties to determine merchants selling the selected item. In some cases, the spend tracking module 112 may analyze webpages associated with one or more merchants to determine whether the merchant sells the selected item. In some cases, the spend tracking module 112 may determine, from the one or more databases, a location, an inventory level, and/or a price for the selected item at the one or more merchants. After identifying the merchants selling the selected item, the spend tracking module 112 may output, to a user interface of the banking application 116, a list of the identified merchants selling the selected item. Additionally or alternatively, the spend tracking module 112 may output a user interface, such as user interface 520j shown in FIG. 5J, of a map displaying locations of the identified merchants thereon. The spend tracking module 112 may determine merchants to output to the list or to the map based on one or more of the inventory level for the item at the merchant, the price of the item at the merchant, and/or the location of the merchant. For instance, the spend tracking module 112 may access the user preference information stored in the database 120 to determine criteria for outputting merchants to the list or the map. For example, the user preference information may indicate that only merchants selling the item for at 25% less than the user's purchase price may be output, only merchants within a predetermined distance of the user computing device 130a may be output, only merchants identified as preferred merchants may be output, only merchants with a confirmed inventory of the selected item may be output, or any combination thereof. Additionally, the spend tracking module 112 may output to the list and/or the map, further information, such as a location of the merchant, a distance of the merchant from the current location of the user computing device 130a, a price of the item, store hours, a number of items in inventor, and the like. In some instances, the spend tracking module 112 may receive a selection of a particular merchant output to the map, such as Merchant C shown in user interface 520j, and may output a user interface to the banking application 116 providing route and/or navigation details from a current location of the user computing device 130a to the selected merchant. The location of the user computing device 130a may be determined by one or more sensors of the computing device 130a, such as a GPS device.

Figure 4:
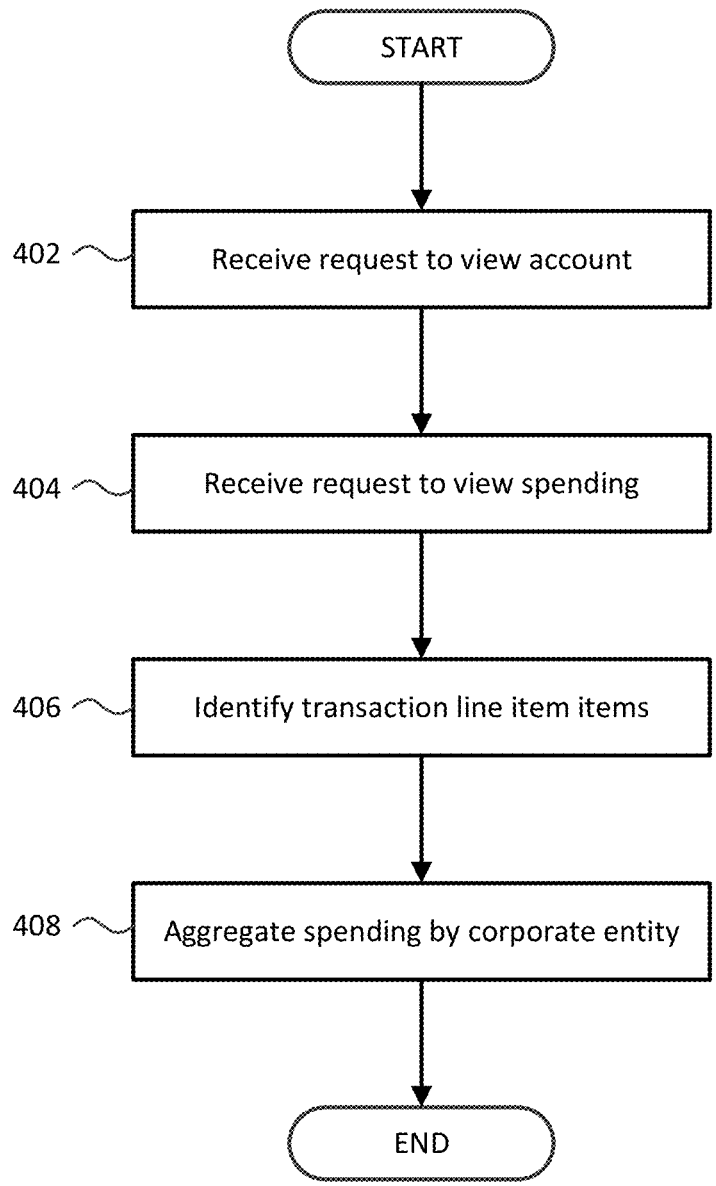
FIG. 4 is a flowchart of an example method of providing aggregated spend tracking information, in accordance with one or more aspects described herein.

Referring to FIG. 4, an example method of providing aggregated spend tracking information, via a banking application, is provided in accordance with one or more aspects described herein. The example methods are described as being performed by the account server 110, however the example methods may be performed by any one of the account server 110, the one or more user computing devices 130, the computing device 200, and/or a combination thereof.

At step 402, the account server 110 may receive a request to view a transaction account, such as a bank account, a credit card account, a commercial account, a line of credit, or the like, maintained by a banking or other financial institution. The request to view the transaction account may be received via the banking application 116.

At step 404, the spend tracking module 112 may receive a request to view spending associated with the transaction account. The request may include a start and an end date for use in retrieving transactions associated with the transaction account having a purchase date between the start and end dates.

At step 406, the spend tracking module 112 may identify transaction line item data corresponding to transactions associated with the transaction account. For instance, the spend tracking module 112 may query the database 120 to identify the line item data and additional information corresponding to the line item data. The additional information may comprise, for example, a corporate entity associated with an item of the line item data (e.g., a parent entity of a brand associated with a product). The identified line item data may correspond to transactions having a purchase date between the specified start and end dates.

At step 408, the spend tracking module 112 may aggregate the spending by corporate entity. The spend tracking module 112 may use the additional information, such as the corporate entity, to sort and aggregate the identified line item data. The spend tracking module 112 may output a user interface to the banking application 116, such as user interface 520k shown in FIG. 5K, comprising an aggregated and sorted list. The spend tracking module 112 may provide one or more options 571 for sorting and/or filtering the list.

The tracking and maintained of individual items purchased during a transaction may be used in a variety of additional ways. For instance, a primary account holder, such as a parent or an employer, may use the banking application 116, for viewing individual items that comprise a secondary account holder's, such as a child's or employee's, spending. By way of example, a parent may provide her college-aged child with access to a credit card on the parent's account. The child may have a credit card separate from that of the parent, and the parent may be able to view the individual items that comprise the purchase transactions made with the child's credit card. One or more user interfaces may be provided via the banking application 116 to allow the primary account holder to set spending limits on an item-by-item basis for one or more accounts controlled by the primary account holder. Such settings may be stored in the database 120 with the user preference information. For instance, the spend tracking module 112 may track spending on an item basis for a given account and may transmit a notification to the primary account holder when spending for a particular item exceeds a spending threshold configured in the user preference information. In some instances and based on the user preference information, the spend tracking module 112 may automatically suspend spending on the affected account when the spending threshold is exceeded.

In other examples, the transaction item-level data may also be useful by the banking institution in detecting fraud associated with an account. Conventionally, banking institutions monitor usage patterns of spending at the transaction and/or merchant level. For instance, conventionally, banking institutions may use various fraud models to make fraud assessments based on whether overall spending or spending at a transaction level exceeds what is typical for the account holder in terms of dollar amount and merchant. Here, the spend tracking module 112 may, using one or more fraud models, make a fraud determination based on monitoring patterns of spending and detecting unusual spending at the item-level. For instance, if the account holder typically spends about $300 a month on clothes—evenly divided between tops, pants, and sneakers, and suddenly spends $300 all on sneakers for one month, the spend tracking module 112 may flag the spending activity as potentially fraudulent. For instance, although the overall spending has not changed in a manner that might otherwise trigger a fraud determination, because a change of spending at the item-level was detected, the spend tracking module 112 may flag the activity as potentially fraudulent. Upon such a fraud determination, the spend tracking module may transmit a notification to the account holder via the one or more user computing devices 103 requesting confirmation that the account holder authorized the purchase. Alternatively or additionally, the spend tracking module 112 may automatically suspend spending on the affected account.

In other examples, the transaction item-level data may also be useful by the banking institution in tailoring product recommendation and incentives to the account holders. Having more complete data regarding what items an account holder spends her money on may be useful in providing account holders with recommendations and incentives, such as discounts, offers, etc. that may be of interest to the account holder. Accordingly, the spend tracking module 112 may monitor patters of spending of an account holder at the item-level and may generate one or more item recommendations and/or incentives for the account holder. The spend tracking module 112 may transmit a message to the account holder's user computing device 130*a* comprising the one or more recommendations and/or incentives. The notification, for example, may provide an indication of an item that is on sale and that may be of interest to the account holder and may indicate the merchant selling the item. The notification may, for example, be a discount code or coupon for purchasing the item at a particular merchant, or the like.

One or more aspects disclosed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language, such as (but not limited to) HTML or XML. The computer-executable instructions may be stored on a computer-readable medium, such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole, or in part, in firmware or hardware equivalents such as integrated circuits, field programmable gate arrays (FPGA), and the like. Particular data structures may be used to more effectively implement one or more aspects disclosed herein, and such data structures are contemplated within the scope of computer-executable instructions and computer-usable data described herein. Various aspects disclosed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A mobile computing device comprising:
a display device;
a camera;
one or more processors; and
memory storing instructions that, when executed by the one or more processors, cause the mobile computing device to:
cause, responsive to a user selection of a transaction from a plurality of purchase transactions, the camera to detect that a user receipt is focused within one or more receipt guides;
cause, based on detecting that the user receipt is focused within the one or more guides, the camera to automatically capture an image that comprises at least a portion of the user receipt, wherein the user receipt is associated with the selected transaction;
process the image using one or more computer vision techniques to determine one or more line items associated with the transaction;
retrieve, from a database, merchant-received line item information associated with the transaction;
based on a discrepancy between at least one of the one or more line items and at least one of the merchant-received line item information, update, in the database, the merchant-received line item information with the one or more line items; and
output, via a user interface of the mobile computing device, an indication that the transaction has been updated with the at least one of the one or more line items.

2. The mobile computing device of claim 1, wherein the instructions, when executed by the one or more processors, further cause the mobile computing device to:
prior to causing the camera to automatically capture the image, receive, via the user interface, the user selection of the transaction from the plurality of purchase transactions.

3. The mobile computing device of claim 1, wherein the instructions, when executed by the one or more processors, further cause the mobile computing device to:
convert the image of the user receipt to textual data.

4. The mobile computing device of claim 3, wherein the instructions, when executed by the one or more processors, further cause the mobile computing device to:
parse the textual data of the user receipt to identify one or more character strings that correspond to the one or more line items associated with the transaction.

5. The mobile computing device of claim 3, wherein the instructions, when executed by the one or more processors, cause the mobile computing device to:
process the textual data using feature extraction algorithms to identify the one or more line items.

6. The mobile computing device of claim 1, wherein the instructions, when executed by the one or more processors, cause the mobile computing device to:

determine, for each of the one or more line items, additional information that comprises at least information identifying a corporate entity associated with each of the one or more line items.

7. The mobile computing device of claim 6, wherein the additional information comprises at least one of:
contact information associated with a brand associated with each of the one or more line items,
warranty information associated with each of the one or more line items, or
return policy information associated with each of the one or more the line items.

8. The mobile computing device of claim 1, wherein the instructions, when executed by the one or more processors, cause the mobile computing device to:
pre-process, using the one or more computer vision techniques, the image that comprises at least the portion of the user receipt; and
post-process, using one or more post-processing techniques, textual data of the user receipt to perform error correction.

9. The mobile computing device of claim 1, wherein the instructions, when executed by the one or more processors, further cause the mobile computing device to:
query one or more databases to retrieve:
a receipt line item format associated with a merchant of the transaction, and
an item identifier format associated with the merchant of the transaction;
determine, based on the receipt line item format associated with the merchant, that a first line item of the one or more line items is associated with the merchant; and
determine additional information associated with the first line item by:
parsing, based on the item identifier format, the first line item to determine an item identifier associated with the first line item; and
querying, using the item identifier associated with the first line item, the one or more databases to retrieve the additional information.

10. The mobile computing device of claim 9, wherein the item identifier format corresponds to a format associated with at least one of:
a universal product code (UPC),
a stock-keeping unit (SKU),
an international standard book number (ISBN),
a global trade item number (GTIN),
an international standard serial number (ISSN),
an international standard music number (ISMN), or
an international article number (IAN).

11. The mobile computing device of claim 1, wherein the instructions, when executed by the one or more processors, further cause the mobile computing device to:
for each of the one or more line items associated with the transaction:
determine an item identifier associated with a corresponding line item;
retrieve, from one or more databases and using the item identifier, a brand identifier associated with the item identifier;
retrieve, from the one or more databases, a webpage associated with a brand identified by the brand identifier; and
determine, based on the webpage, additional information associated with the corresponding line item.

12. The mobile computing device of claim 1, wherein the instructions, when executed by the one or more processors, further cause the mobile computing device to:
receive, via the user interface, a user selection of a first line item of the one or more line items;
determine a merchant associated with the transaction;
determine a webpage associated with the merchant; and
transmit, via the webpage associated with the merchant, form data to initiate at least one of:
a return process of an item associated with the selected first line item, or
a warranty claim process for the item associated with the selected first line item.

13. The mobile computing device of claim 1, wherein the instructions, when executed by the one or more processors, further cause the mobile computing device to:
receive, via the user interface, a user selection of a first line item of the one or more line items;
determine a purchase price associated with the selected first line item;
determine, using one or more sensors of the mobile computing device, a location of the mobile computing device;
identify one or more merchants within a threshold proximity to the location of the mobile computing device, wherein the one or more merchants are associated with a price, of the selected first line item, that is lower than the purchase price associated with the selected first line item; and
output, to the display device and via the user interface, a map indicating one or more locations of the one or more merchants.

14. The mobile computing device of claim 1, wherein the one or more computer vision techniques comprise Optical Character Recognition (OCR) algorithms.

15. A method comprising:
causing, responsive to a user selection of a transaction from a plurality of purchase transactions, a camera associated with a mobile computing device to detect that a user receipt is focused within one or more receipt guides;
casing, based on detecting that the user receipt is focused within the one or more guides, the camera to automatically capture an image that comprises at least a portion of the user receipt, wherein the user receipt is associated with the selected transaction;
processing the image using one or more computer vision techniques to determine one or more line items associated with the transaction;
retrieving, from a database, merchant-received line item information associated with the transaction;
based on a discrepancy between at least one of the one or more line items and at least one of the merchant-received line item information, updating, in the database, the merchant-received line item information with the one or more line items; and
outputting, via a user interface of the mobile computing device, an indication that the transaction has been updated with the at least one of the one or more line items.

16. The method of claim 15, further comprising:
converting the image of the user receipt to textual data; and
parsing the textual data of the user receipt to identify one or more character strings that correspond to the one or more line items associated with the transaction.

17. The method of claim 15, further comprising:
converting the image of the user receipt to textual data; and
processing the textual data, using feature extraction algorithms, to identify the one or more line items.

18. One or more non-transitory, computer-readable media storing instructions that, when executed by one or more processors of a computing device, cause the computing device to:
cause, responsive to a user selection of a transaction from a plurality of purchase transactions, a camera associated with a mobile computing device to detect that a user receipt is focused within one or more receipt guides;
cause, based on detecting that the user receipt is focused within the one or more guides, the camera to automatically capture an image that comprises at least a portion of the user receipt, wherein the user receipt is associated with the selected transaction;
process the image using one or more computer vision techniques to determine one or more line items associated with the transaction;
retrieve, from a database, merchant-received line item information associated with the transaction;
based on a discrepancy between at least one of the one or more line items and at least one of the merchant-received line item information, update, in the database, the merchant-received line item information with the one or more line items; and
output, via a user interface of the mobile computing device, an indication that the transaction has been updated with the at least one of the one or more line items.

19. The one or more non-transitory, computer-readable media of claim 18, wherein the instructions, when executed by the one or more processors, cause the computing device to:
receive, via the user interface, a user selection of a first line item of the one or more line items;
determine a merchant associated with the transaction;
determine a webpage associated with the merchant; and
transmit, via the webpage associated with the merchant, form data to initiate at least one of:
a return process of an item associated with the selected first line item, or
a warranty claim process for the item associated with the selected first line item.

20. The one or more non-transitory, computer-readable media of claim 18, wherein the instructions, when executed by the one or more processors, cause the computing device to:
receive, via the user interface, a user selection of a first line item of the one or more line items;
determine a purchase price associated with the selected first line item;
determine, using one or more sensors of the mobile computing device, a location of the mobile computing device;
identify one or more merchants within a threshold proximity to the location of the mobile computing device, wherein the one or more merchants are associated with a price, of the selected first line item, that is lower than the purchase price associated with the selected first line item; and
output, via the user interface, a map indicating one or more locations of the one or more merchants.

\* \* \* \* \*